(12) United States Patent
Jacobson

(10) Patent No.: US 8,756,653 B2
(45) Date of Patent: *Jun. 17, 2014

(54) NETWORK POLICY MANAGEMENT AND EFFECTIVENESS SYSTEM

(71) Applicant: Yaszistra Fund III, LLC, Dover, DE (US)

(72) Inventor: Andrea M. Jacobson, St. Paul, MN (US)

(73) Assignee: Yaszistra Fund III, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,778

(22) Filed: Feb. 19, 2013

(65) Prior Publication Data

US 2013/0276055 A1    Oct. 17, 2013

Related U.S. Application Data

(60) Division of application No. 12/913,576, filed on Oct. 27, 2010, now Pat. No. 8,381,305, which is a continuation of application No. 11/743,590, filed on May 2, 2007, now Pat. No. 7,917,938, which is a continuation of application No. 10/815,092, filed on Mar. 31, 2004, now Pat. No. 7,231,668, which is a continuation of application No. 09/104,946, filed on Jun. 25, 1998, now Pat. No. 6,735,701.

(51) Int. Cl.
*G06F 17/00* (2006.01)
*H04L 29/06* (2006.01)

(52) U.S. Cl.
USPC .................................. 726/1; 726/22

(58) Field of Classification Search
USPC ................... 726/1, 22–26; 709/223–224
See application file for complete search history.

(56) References Cited

U.S. PATENT DOCUMENTS

| 4,935,870 | A | 6/1990 | Burk et al. |
| 5,040,141 | A | 8/1991 | Yazima et al. |
| 5,142,612 | A | 8/1992 | Skeirik |
| 5,197,114 | A | 3/1993 | Skeirik |

(Continued)

FOREIGN PATENT DOCUMENTS

| EP | 0346556 | 12/1989 |
| WO | WO-9311480 | 6/1993 |
| WO | WO-9967931 | 12/1999 |
| WO | WO-0023931 | 4/2000 |

OTHER PUBLICATIONS

"Data Exchange Executive". IBM TDB, Jul. 1993, vol. 36, Issue No. 7, p. 435-438. {IDB-ACC-No:NN9307435}.

(Continued)

*Primary Examiner* — Samson Lemma
(74) *Attorney, Agent, or Firm* — Perkins Coie LLP

(57) ABSTRACT

The Present Invention discloses a method and apparatus for maintaining policy compliance on a computer network. A system in accordance with the principles of the Present Invention performs the steps of electronically monitoring network user compliance with a network security policy stored in a database, electronically evaluating network security policy compliance based on network user compliance and electronically undertaking a network policy compliance action in response to network security policy non-compliance. The network policy compliance actions may include automatically implementing a different network security policy selected from network security policies stored in the database, generating policy effectiveness reports and providing a retraining module to network users.

20 Claims, 51 Drawing Sheets

(56) References Cited

U.S. PATENT DOCUMENTS

| | | | |
|---|---|---|---|
| 5,245,532 A | | 9/1993 | Mourier |
| 5,355,474 A | | 10/1994 | Thuraisngham et al. |
| 5,408,333 A | | 4/1995 | Kojima et al. |
| 5,408,586 A | | 4/1995 | Skeirik |
| 5,440,744 A | | 8/1995 | Jacobson et al. |
| 5,579,222 A | | 11/1996 | Bains et al. |
| 5,581,749 A | | 12/1996 | Hossain et al. |
| 5,603,054 A | * | 2/1997 | Theimer et al. ............ 710/6 |
| 5,621,889 A | | 4/1997 | Lermuzeaux et al. |
| 5,627,764 A | | 5/1997 | Schutzman et al. |
| 5,632,011 A | | 5/1997 | Landfield et al. |
| 5,754,938 A | * | 5/1998 | Herz et al. ............ 725/116 |
| 5,768,362 A | | 6/1998 | Moon |
| 5,786,817 A | | 7/1998 | Sakano et al. |
| 5,797,128 A | | 8/1998 | Birnbaum |
| 5,845,065 A | | 12/1998 | Conte et al. |
| 5,893,099 A | | 4/1999 | Schreiber et al. |
| 5,906,656 A | | 5/1999 | Keller et al. |
| 5,974,149 A | * | 10/1999 | Leppek ............ 713/164 |
| 5,991,879 A | * | 11/1999 | Still ............ 726/1 |
| 6,044,471 A | | 3/2000 | Colvin |
| 6,047,377 A | | 4/2000 | Gong |
| 6,070,244 A | | 5/2000 | Orchier et al. |
| 6,088,720 A | | 7/2000 | Berkowitz |
| 6,108,688 A | | 8/2000 | Nielsen |
| 6,202,157 B1 | | 3/2001 | Brownlie et al. |
| 6,330,653 B1 | | 12/2001 | Murray et al. |
| 6,370,566 B2 | | 4/2002 | Discolo et al. |
| 6,408,336 B1 | * | 6/2002 | Schneider et al. ............ 709/229 |
| 6,460,142 B1 | | 10/2002 | Colvin |
| 6,484,261 B1 | | 11/2002 | Wiegel |
| 6,735,701 B1 | | 5/2004 | Jacobson |
| 7,231,668 B2 | | 6/2007 | Jacobson |
| 7,689,563 B1 | | 3/2010 | Jacobson |
| 7,917,938 B2 | | 3/2011 | Jacobson |
| 8,381,305 B2 | | 2/2013 | Jacobson |
| 2004/0167984 A1 | | 8/2004 | Herrmann |
| 2007/0143851 A1 | | 6/2007 | Nicodemus et al. |

OTHER PUBLICATIONS

Grimm, R. et al. "Security Policies in OSI—management experiences from the DeTeBerkom project BMSec". *Computer Networks and ISDN System*, vol. 28, No. 4, pp. 499-511 (Feb. 1996).
"SecureDelete—a utility to delete files securely". http://www.gammon.com.au/utilities/securedelete.htm. (Sep. 14, 1998); 3 pgs.
"Review: Burn It". http://macworld.zdnet.com/pages/april.97/Reviews.3342.html. (Sep. 14, 1998); 3 pgs.
"Content Advisor—Products Page". http://www.contentadvisor.com/products/products.html. (Sep. 14, 1998); 1 pg.
"Content Advisor—Corporate Profile". http://www.contentadvisor.com/company/company.html. (Sep. 14, 1998); 1 pg.
"SmartFilter—Tour, Monitoring and Control Features". http://www.sctc.com/P_Tool_SF_Tour_monandcont.html. (Sep. 19, 1998); 1 pg.
"SF—Key Advantages". http://www.sctc.com/P_Tool_SF_Keys.html. (Sep. 19, 1998); 2 pg.
"SF—Requirements". http://www.sctc.com/P_Tool_SF_Reqs.html. (Sep. 19, 1998); 1 pg.
"Vendor's Guide to Software Pricing—Articles on License Management". http://www.globetrotter.com/ms_titl.html. (Apr. 7, 1998); 6 pgs.
"No Excuses Licensing". http://www.globetrotteLcom/ecs1.htm. (Feb. 3, 1998); 5 pgs.
"Seven Steps to Overcome Pricing Uncertainty with Flexible Software Licensing—Articles on License Management". http://www.globetrottercom/ms_2do.htm (Apr. 7, 1998) 2 pgs.
"Conceptual description of a generic license manager—Articles on License Management". http://globetrotter.com/ms_lm.htm (May 18, 1998) 3 pgs.
"Press Release—Poulton Associates, Inc". http://www.poulton.com/ispPR4-98.htm. (Sep. 23, 1998), 2 pgs.

"ISPCweb—Poulton Associates, Inc.". http://www.poulton.com/ispcweb.htm. (Sep. 23, 1998); 2 pgs.
Cronin, Kevin P. "As courts increasingly hold firms liable for losses caused by computer failures, recovery capabilities are fast becoming a legal necessity". *Disaster Recovery Journal*, vol. 6, No. 2. http://www.drj.com/new2dr/w2_022.htm (Feb. 2, 1998); 5 pgs.
"Risk Analysis Techniques". http://www.drj.com/new2dr/w3_030.htm. (Feb. 2, 1998); 8 pgs.
"White papers-Watermarking". http://www.dupont.com/Antron/mark.html. (Jul. 16, 1998); 1 pg.
"About Digital Watermarks". http://www.digimarc.com/about_wm.html. (Mar. 10, 1998); 4 pgs.
"Digimarc Corporate Series". http://www.digimarc.com/corp_solutions.html. (Mar. 10, 1998); 3 pgs.
"Welcome to Digimarc". http://www.digimarc.com/. (Mar. 10, 1998); 2 pgs.
"MarcCentre". http://www.digimarc.com/marc page.html. (Mar. 10, 1998); 1 pg.
"Data Devices International—Tape Backup Procedures and Maintenance". http://www.datadev.com/tapebackup/tapebackup.htm (Sep. 9, 1998); 2 pgs.
"Halebopp Backup Procedures". http://www.gb.nrao.edu/-cmyerslbackup.html (Sep. 9, 1998); 2 pgs.
"ISSEL-Intra.doc! Management System". http://www.issel.co.uk/intradoc_ms.html (Feb. 23, 1998); 2 pgs.
"ISSEL-Intra.doc! Architecture". http://www.issel.co.uk/intradoc_architecture.html (Feb. 23, 1998); 2 pgs.
"Intra.doc! Product Suite". http://www.intranetsol.com/products/prodsuit.html (Feb. 23, 1998); 8 pgs.
"Intra.doc! Management System—Web-Based Document Management and Enterprise Publishing". http://intranetsol.com/products/msbroch.html (Feb. 23, 1998); 4 pgs.
"High-tech Manufacturer Gains Competitive Edge With Web-based Document Management". http://www.intranetsol.com/products/success/sshight.html (Feb. 23, 1998) 3 pgs.
"QRMS—Features". http://www.qrms.com/features.htm (Feb. 18, 1998); 19 pgs.
"The TPI Group Inc.—Software Asset Management". http://www.tpi-group.com/whitepapers/wpsasset.html (Feb. 3, 1998); 1 pg.
"The TPI Group—Software Asset Management in a Client Server Architecture". http://www.tpi-group.com/whitepapers/wpsasset.html (Feb. 3, 1998); 11 pgs.
Branscum, D. bigbrother@the.office.com-Your boss can track every click you make. *Newsweek*, Apr. 27, 1998, p. 78.
Fox, J. "Compensating your executive team on a shoestring". *Ventures*, Nov. 1997, pp. 14- 16.
"Corel WordPerfect Suite 8—Data Formats Supported". White Paper, Aug. 1997 (p. 16).
May, A. D. "Automatic Classification of Email Messages by Message Type". *Journal for the American Society for Information Science*, vol. 48, No. 1 (Jan. 1, 1997), pp. 32-39.
Takkinen, J. et al. "Cafe: A Conceptual Model for Managing Information in Electronic Mail." Proceedings of the Annual Hawaii International Conference on System Sciences, (Jan. 1, 1998), pp. 44-53.
Gerber, Cheryl. Reliastar Financial, *Computerworld*, v4n5; Aug. 1996 pp. 1-2.
"ISOCOR Adds Message Application Programming Interface Products". *Computergram International*, n2398; Apr. 20, 1994; pp. 1-2.
Schafer, S. "High-Tech Hoods". *Inc. Technology*, vol. 1, 1997, pp. 48-51.
Various documents—Tower Software Engineering Pty. Ltd. http://www.ustrim.com (Feb. 19, 1998), 49 pages.
PCT/US1999/013998, PCT Initial Publication with International Search Report. WO99/67931 published on Dec. 29, 1999, 93 pages.
PCT Written Opinion, PCT/US99/13998, mailed Mar. 9, 2000, 8 pages.
PCT International Preliminary Examination Report, PCT/US99/13998, Jul. 28, 2000, 6 pages.
Non-Final Office Action, U.S. Appl. No. 09/104,946, Sep. 13, 2000, 8 pages.
Final Office Action, U.S. Appl. No. 09/104,946, Jun. 5, 2001, 9 pages.
Final Office Action, U.S. Appl. No. 09/104,946, Dec. 18, 2001, 9 pages.

(56) References Cited

OTHER PUBLICATIONS

Non-Final Office Action, U.S. Appl. No. 09/104,946, Sep. 25, 2002, 10 pages.
Notice of Allowance, U.S. Appl. No. 09/104,946, Dec. 16, 2003, 4 pages.
Non-Final Office Action, U.S. Appl. No. 10/815,092, Mar. 24, 2006, 5 pages.
Notice of Allowance, U.S. Appl. No. 10/815,092, Jan. 23, 2007, 4 pages.
Non-Final Office Action, U.S. Appl. No. 09/175,589, Oct. 19, 2000, 6 pages.
Final Office Action, U.S. Appl. No. 09/175,589, Jul. 2, 2001, 8 pages.
Advisory Action, U.S. Appl. No. 09/175,589, Sep. 11, 2001, 3 pages.
Non-Final Office Action, U.S. Appl. No. 09/175,589, Mar. 29, 2002, 9 pages.
Final Office Action, U.S. Appl. No. 09/175,589, Jan. 2, 2003, 12 pages.
Interview Summary, U.S. Appl. No. 09/175,589, Feb. 28, 2003, 4 pages.
Advisory Action, U.S. Appl. No. 09/175,589, Apr. 8, 2003, 3 pages.
Non-Final Office Action, U.S. Appl. No. 09/175,589, Sep. 24, 2003, 13 pages.
Final Office Action, U.S. Appl. No. 09/175,589, Mar. 9, 2004, 14 pages.
Advisory Action, U.S. Appl. No. 09/175,589, Jul. 12, 2004, 3 pages.
Non-Final Office Action, U.S. Appl. No. 09/175,589, Nov. 30, 2004, 11 pages.
Final Office Action, U.S. Appl. No. 09/175,589, Jun. 2, 2005, 13 pages.
Non-Final Office Action, U.S. Appl. No. 09/175,589, Feb. 13, 2006, 10 pages.
Withdrawal of Office Action, U.S. Appl. No. 09/175,589, Jul. 17, 2006, 3 pages.
Non-Final Office Action, U.S. Appl. No. 09/175,589, Nov. 20, 2006, 11 pages.
Non-Final Office Action, U.S. Appl. No. 09/175,589, Jun. 1, 2007, 5 pages.
Non-Final Office Action, U.S. Appl. No. 09/175,589, Oct. 26, 2007, 5 pages.
Non-Final Office Action, U.S. Appl. No. 09/175,589, May 12, 2008, 7 pages.
Non-Final Office Action, U.S. Appl. No. 09/175,589, May 12, 2009, 17 pages.
Notice of Allowance, U.S. Appl. 09/175,589, Oct. 29, 2009, 14 pages.
Non-Final Office Action, U.S. Appl. No. 11/743,590, Mar. 18, 2009, 14 pages.
Non-Final Office Action, U.S. Appl. No. 11/743,590, Oct. 28, 2009, 21 pages.
Final Office Action, U.S. Appl. No. 11/743,590, May 11, 2010, 25 pages.
Interview Summary, U.S. Appl. No. 11/743,590, Jun. 22, 2010, 3 pages.
Notice of Allowance, U.S. Appl. No. 11/743,590, Sep. 3, 2010, 18 pages.
Notice of Allowance, U.S. Appl. No. 11/743,590, Feb. 23, 2011, 4 pages.
Personnel Security Appeals Board (PSAB), Apr. 20, 1995, U.S. Department of the Navy, p. 1.
U.S. Department of State Foreign Affairs Manual, vol. 12—Diplomatic Security, 2002, 24 pages.
International Search Report, PCT Application PCT/US1999/024549, mailed May 8, 2000, 3 pages.
Restriction Requirement, U.S. Appl. No. 12/913,576, Aug. 19, 2011, 9 pages.
Non-Final Office Action U.S. Appl. No. 12/913,576, Oct. 4, 2011, 18 pages.
Final Office Action, U.S. Appl. No. 12/913,576, May 30, 2012, 18 pages.
Notice of Allowance, U.S. Appl. No. 12/913,576, Oct. 9, 2012, 20 pages.

* cited by examiner

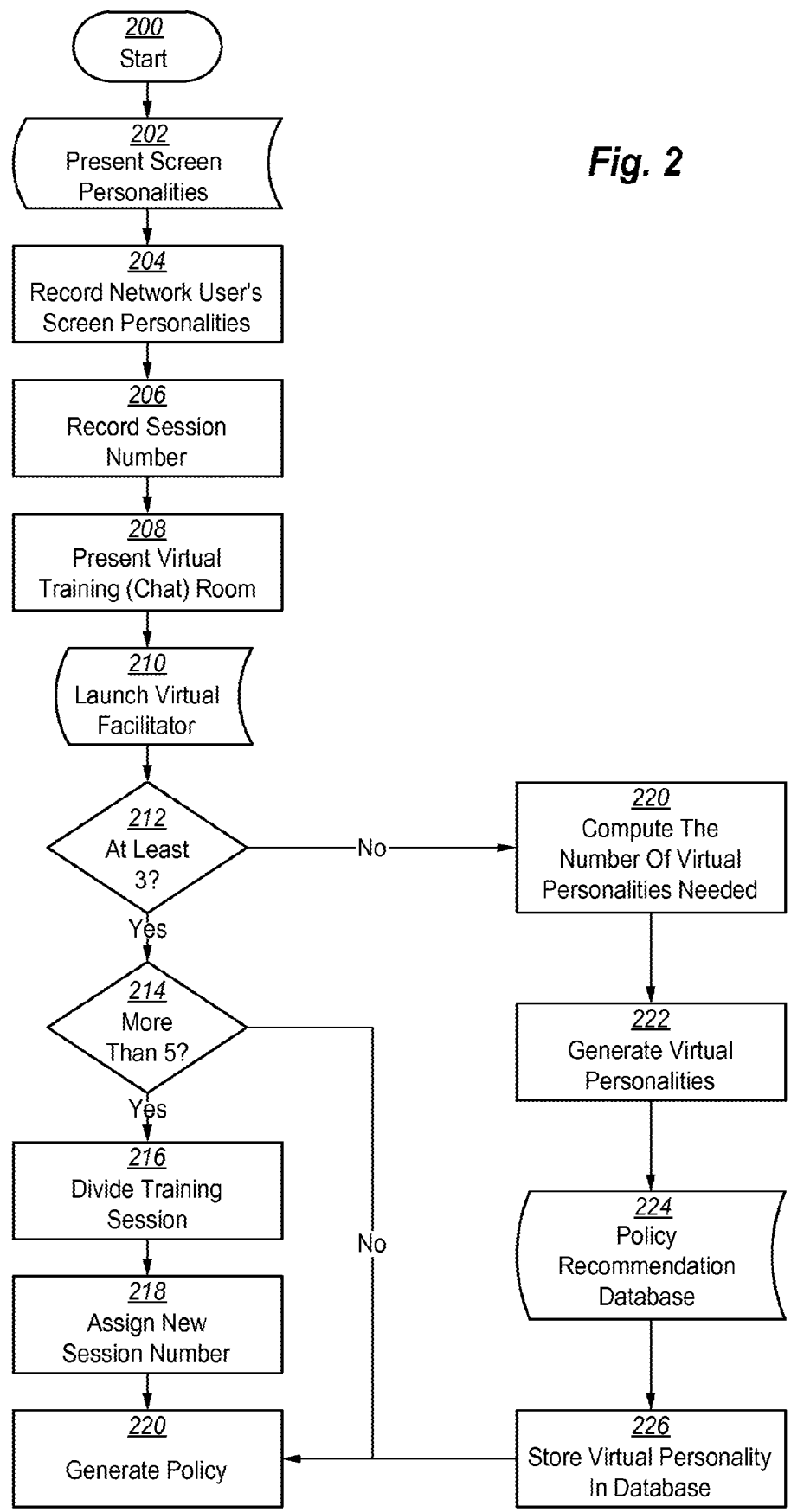

Policy Suggestion

Desktop Piracy

Suggested Policy: To comply with laws governing software protection from piracy employees must not:
- Make copies of any software unless explicitly authorized.
- Exchange, trade or transfer copies of any software to others in cyberspace.
- Download copies of software that normally would have to be purchased.
- Purchase any software from the Internet without prior approval If you encounter pirated software or suspect software may have been pirated, notify the system administrator immediately and distance yourself from the real or suspected illegal activity.

Premise: Expect different people to have different standards. They are not better, not worse - simply different.

Principle: The principle of present choices states that current decisions tend to limit future action. This means that most important decisions affect two timeframes. The short-term result may be a benefit but the long - term result can be either a benefit or, as often happens, a consequence.

Do you agree or disagree with the suggested policy?

What changes would you make to the suggested policy?

| Submit | Pause | Exit | Menus | Stats | Support |

*Fig. 18*

Writing the Policy

Suggested Policy: To comply with laws governing software protection from piracy employees must not:

- Make copies of any software unless explicitly authorized.
- Exchange, trade or transfer copies of any software to others in cyberspace.
- Download copies of software that normally would have to be purchased.
- Purchase any software from the Internet without prior approval If you encounter pirated software or suspect software may have been pirated, notify the system administrator immediately and distance yourself from the real or suspected illegal activity.

Facilitator: If I am correct, you want this section added to the policy?
Add>>>> *All software downloads can be approved by the system administrator. The user needs to email the system administrator to get approval for downloading the software.*

*Fig. 21*

Vote on a Policy Recommendation

To comply with laws governing software protection from piracy employees must not:
- Make copies of any software unless explicitly authorized.
- Exchange, trade or transfer copies of any software to others in cyberspace.
- Download copies of software that normally would have to be purchased.
- All software downloads can be approved by the system administrator. All network user needs to email the system administrator to get approval before downloading the software.
- Purchase any software from the Internet without prior approval If you encounter pirated software or suspect software may have been pirated, notify the system administrator immediately and distance yourself from the real or suspected illegal activity.

Do you agree or disagree with the policy?

( Agree )    ( Disagree )

( < ) ( > ) ( Main Menu ) ( Exit )

*Fig. 22*

Policy Training Exam

What is spam?

- A slang term for an electronic contract
- A luncheon meat
- A slang term for junk e-mail
- A term used for downloading files from the web < > Main Menu Exit

*Fig. 25*

Training Feedback Form

Was the subject pertinent to your needs and interests?
No                                    To some extent
Very Much So Excellent     Satisfactory    Dissatisfactory
Adequacy of Course Content
Length of Course
Adequacy of Course Materials
Adequacy of Learning Experience
Adequacy of Facilities If any factor is rated "unsatisfactory", please provide explanation:

What was of least value to you in this seminar?

What was of the most value to you in this seminar?

How will you apply this learning back on the job?

Would you recommend this course for other individuals/teams?
         Yes                    No ( < ) ( > )  ( Main Menu )  ( Exit )

*Fig. 26*

Acceptable Use Agreement

CONTINUE

8. The company operates a reliable and effective computing environment and network, however the company does not warrant that the system will meet any specific user requirement or that the system will be error free or uninterrupted. The company shall not be liable for any direct or indirect, incidental or consequential damages sustained or incurred on connection with the use or inability to use the company system.

User Signature
_____

Date: _____

Manager: _____

Internet e-mail address:
_____ @ _____

Click icons to accept or decline the terms of the Acceptable Use Policy.

( Accept )         ( Decline )

( < )( > ) ( Main Menu ) ( Exit )

*Fig. 28*

The End.....

Thank your for participating in the policy training program.

*Fig. 29*

User Profile

Name:
Employee Number:
Email Address:
Surface Mail Address:
Employment Status (i.e. temp, contract, virtual):
Organizational/reporting chart:
Title:
Department/Unit Title:
Branch Division:
Mail Address:

USER PROFILE REPORTS

User's Employment Agreements and other contracts:
Policy Training and Exam Status:
Policy Compliance History
Network Activity History
Special Network Access or Privileges
Email Storage allocation
Document access level
User Access to including failed login attempts
All Attempts to launch privileged applications
Any changes to system configuration parameters
Software downloads from the Internet
Software usage
Hardware usage
Software present on a user's workstation
User's system access and security status
Identify need for upgrades
Identify need for training ( > ) ( < ) ( Main Menu ) ( Send ) ( Print ) ( Exit )

*Fig. 31*

Network Policy Compliance Notice

Reference Number: 985h34
Posted-Date: Mon, 20 May 1998 16:17:36 -0500 (CDT)
To: Jane Doe@virt.com
From: PolicyAdm@virt.com
Subject: Violation Notice

Network Non-Compliance Notice
Name:
Email Address:
Title:
Department/Unit Title:
Branch/Division:
Mail Address:
Violation:
Violation History: (hyperlink)

( > ) ( < ) ( Main Menu ) ( Send ) ( Print ) ( Exit )

*Fig. 36*

Policy Knowledge Query

Name: _____

Violation: ▨ Minor Violation  ▨ Major Violation
Type of Violation: (choose from drop down box)

[                                    ]

Branch Location: _____
Date: _____
Policy Administrator: _____

Additional details:

[                                    ]

[ Search ]   [ Reset ]   [ Cancel ]

( User Help )  Click icon for more information on how to respond to a violation report.

(>) (<) ( Main Menu ) ( Send ) ( Print ) ( Exit )

*Fig. 40*

Policy Compliance Report Form

Violator's Name:

Email Address:

Title:

Department:

Mail Station

Violation: ▨ Minor Violation   ▨ Major Violation
Type of Violation: (choose from drop down box)

Branch Location:

Date of Occurrence:

Date of Report

Official Reporting The Incident

Policy Administrator:

Additional details:

Ok    Reset    Cancel

>   <   Main Menu   Send   Print   Exit

*Fig. 41*

System Violation Notice
Email and Snail Mail Notice

| | |
|---|---|
| Name: | Jane Doe |
| User Profile: | (Review Profile from drop down menu) Sent an email with confidential file attachment |
| Violation Level: | Level 2 |
| Branch Location: | Minneapolis |
| Time: | 11:20 a.m. |
| Date: | May 20, 1998 |
| CC: | Jsmith@Virt.com |
| | PolAdm@Virt.com |
| | Policy@virtualworkspace.com |
| File Attachments: | Scheduling and violation report |

The system indicates you have violated a virtual policy. Attached is a policy violation claim report for your review.

We will need your assistance to investigate the claim to determine if it is indeed accuate and if it warrants further discussion. Please follow the procedures below.

- Review the attached policy violation claim report
- Review your User's Violation History file at http://www.uservi.com
- Indicate any discrepancies in any of the reports
- Indicate your availability for an In-person follow up meeting For further information click the user icon ( User )

All report and Investigation Information is automatically recorded in the system.

Thank you for your cooperation.

*Fig. 43*

Subsequent Action Report

Name: Jane Doe

Violation Level: Level 2
Branch Location: Minneapolis
Time: 11:20 a.m.
Date: May 20, 1998
CC: Jsmith@Virt.com
PolAdm@Virt.com
Policy@virtualworkspace.com
File Attachments: Subsequent Action Report Following the violation meeting, Human Resources and the user are required to file a subsequent meeting report to verify their attendance at the meeting.

The report can be accessed by click the report icon (Report)

If you have any additional questions or concerns, you may contact the Policy Administrator via email: PolAdm@Virt.com or by calling 555-1212.

If you do not agree with the outcome of the meeting, you may file for an appeal. To begin the appeal process, click on the appeal icon.

(Appeal)

(>) (<) (Main Menu) (Send) (Print) (Exit)

*Fig. 44*

Policy Effectiveness Reports

Compliance Reports

Enter access code:

Enter hardware token:

Choose report(s) to review:

User/User profiles
    Network nodes
    Department
    Division
    Branch
    Application
    Time Duration
    Timeframe based on:
    Historical and statistical reports
    Current
    Year-to-date
    Custom time frames
    Other ( > ) ( < ) ( Main Menu ) ( Send ) ( Print ) ( Exit )

*Fig. 46*

Policy Effectiveness Reports
Enterprise-Wide Reports

Enter access code:

Enter hardware token:

Choose report(s) to review:

Policy compliance reports
    Risk assessment
    Strengths and weaknesses in policy compliance
    and non-compliance
    Email compliance reports
    Software compliance reporting
    Patterns, statistics and assessment of policy violations
    and non-compliances
    System backup reports
    Document tracking reports
    Audit and reconciliation reports ( > ) ( < ) ( Main Menu ) ( Send ) ( Print ) ( Exit )

*Fig. 47*

Policy Effectiveness Action

| | |
|---|---|
| Name: | SystemAdm@Virt.com |
| | |
| Violation Level: | Level 2 |
| Branch Location: | Minneapolis |
| Time: | 11:20 a.m. |
| Date: | May 20, 1998 |
| CC: | Network@Virt.com |
| | Policy@virtualworkspace.com |
| File Attachments: | Policy Effectiveness Action Report |

Policy Effectiveness has implemented a policy change for personal email usage.

The new policy set the daily personal email usage at 35 messages vs. the previous 30 message limit. The personal email policy can be accessed at http://www.policy/personalemail.com ( Appeal )

( > ) ( < ) ( Main Menu ) ( Send ) ( Print ) ( Exit )

*Fig. 48*

NETWORK POLICY MANAGEMENT AND EFFECTIVENESS SYSTEM

CROSS-REFERENCE TO RELATED APPLICATIONS

This Application is a Divisional of U.S. patent application Ser. No. 12/913,576, filed on 27 Oct. 2010, which is a Continuation of U.S. patent application Ser. No. 11/743,590, filed on 2 May 2007, now issued as U.S. Pat. No. 7,917,938, which is a Continuation of U.S. patent application Ser. No. 10/815,092, filed on 31 Mar. 2004, now issued as U.S. Pat. No. 7,231,668, which is a Continuation of U.S. patent application Ser. No. 09/104,946, filed on 25 Jun. 1998, now issued as U.S. Pat. No. 6,735,701. All of which are hereby incorporated by reference in their entireties.

BACKGROUND OF THE INVENTION

1. Field of the Invention

The Present Invention relates in general to networked computing systems, and, more particularly, to a system for maintaining network security policy compliance.

2. Description of the Related Art

Electronic networks, such as the Internet and various business computer networks, allow business organizations to store applications and information on central servers, having the ability to be called up and manipulated from any location. These networks allow people greater access to files and other confidential information. Global networks, such as the Internet, coupled with the ability of remote access, increase (1) the vulnerability of corporate data, (2) the risk of information leaks, (3) the risk of unauthorized document access and the disclosure of confidential information, (4) fraud and (5) attacks on privacy.

Ironically, in some instances, employees are the greatest threat to an organization's information security. Employees with access to information resources including electronic mail ("email"), the Internet and on-line networks significantly increase the security risks.

In many situations, employees are using email for personal purposes, creating questions of appropriate use of company resources, workplace productivity and appropriateness of message content. One of the greatest sources of information leaks is employee-sent email. With electronic communication and networks, an electronic paper trail is harder to determine, since no record of who accessed, altered, tampered with, reviewed or copied a file can make it very difficult to determine a document's authenticity, and provide an audit and paper trail. In addition, there is no automated system to centrally collect, analyze, measure, index, organize, track, determine authorized and unauthorized file access and disclosure, link hard copy information with electronic files including email and report on how information flows in and out of an organization.

Setting proper use and security policies comprise a generally-accepted method of creating order and setting standards for network use in the workplace. These policies are, nevertheless, ineffective unless users understand and comply with the policies. Unfortunately, most organizations do not have tangible proof when, and if, a network-based policy violation has occurred until long after the damage has been done. Due to the technical nature of network policy violations, policy enforcement officers may not have adequate knowledge, skill and evidence to properly execute a policy violation claim. Cases of selective policy enforcement can occur if policy violations are not consistently reported, filed, investigated and resolved.

Employees often view email as equivalent to a private conversation. However, this view often does not reflect the official position of the organization, or of generally-accepted societal norms. Sometimes, these email communications reflect preliminary thoughts or ideas that have not been reviewed by the organization and typically only reflect the personal opinion of the parties involved. Yet, since employees of the organization create these communications, courts and regulatory agencies have concluded that employee communications can reflect the organization's view.

Previous attempts have been made to develop a network policy management system in the workplace. Unfortunately, each previous attempt has failed to develop an effective network policy management system in the workplace For example, U.S. Pat. No. 5,355,474 to Thuraisagham et al., titled "System For Multilevel Secure Database Management Using A Knowledge Base With Release-Based And Other Security Constraints For Query, Response And Update Modification," describes an integrated architecture apparatus for an extended multilevel secure database management system. In Thuraisagham, the multilevel secure database management system processes security constraints to control certain unauthorized inferences through logical deduction upon queries by users and is implemented when the database is queried through the database management system, when the database is updated through the database management system and when the database is designed using a database design tool. Thuraisagham is not intended to insure optimal policy compliance and effectiveness. Further, it does not analyze network security policy compliance actions undertaken to determine ineffectual policies to modify and then automatically implement a different network security policy. Rather, *Thuraisagham* is a secure database management system that processes security constraints (rules that assign security levels to data) to control certain unauthorized inferences through logical deduction upon queries by users and is implemented when the database management system is updated.

Second, U.S. Pat. No. 5,440,744 to Jacobson et al., titled "Methods And Apparatus For Implementing Server Functions In A Distributed Heterogeneous Environment," describes that, in distributed heterogeneous data processing networks, a dispatcher and a control server software components execute the code of a single application or of many portions of the code of one or more applications in response to a method object (which includes a reference to the code to be executed) received from a client application. Although Jacobson provides an efficient and simple manner for an application on one platform to be invoked by an application on the same of different platform, like Thuraisagham, Jacobson is not intended to insure optimal policy compliance and effectiveness. Further, it does not analyze network security policy compliance actions undertaken to determine ineffectual policies to modify and then automatically implement a different network security policy.

Third, U.S. Pat. No. 5,621,889 to Lemuzeaux et al., titled "Facility For Detecting Intruders And Suspect Callers In A Computer Installation And A Security System Including Such A Facility," describes a facility for detecting intrusions and suspect users in a computer installation and a security system incorporating such a facility that makes use of surveillance data relating to the operation of the installation. The facility includes elements for modeling the computer installation, its users and their respective behavior with the help of a semantic network; elements for comparing the "modelized" behavior of the system and of its users relative to modelized normal behavior; elements for interpreting observed anomalies in terms of intrusions and of intrusion hypothesis; elements for interpreting observed intrusion hypotheses and intrusions in order to indicate them and enable restraint actions to be prepared. Elements are provided to evaluate the degree of suspicion of users. The elements cooperate with one another for the purpose of providing information. Lemuzeaux is intended to detect network security intrusions. The expert system serves to check the behavior of the computer installation and it's users in such a matter as to determine whether said behavior complies with the behavior and security rules already established.

Fourth, U.S. Pat. No. 5,797,128 to Birnbaum, titled "System And Method For Implementing A Hierarchical Policy For Computer System Administration," describes a system and method for implementing a hierarchical policy for computer system administration which is extremely flexible in assigning policies to managed objects. Policies are defined to be rules for the values of the attributes of managed objects. Policy groups comprise the basic building blocks and they associate a set of policies with a set of managed objects. Policy groups can also be members of other policy groups and a policy group inherits the policies of its parent policy groups supporting the hierarchical specification of policy. A given policy group may have multiple parents which allows the "mix-in" of policies from the parents. Cloning and templates in conjunction with validation policies and policy groups provide standardization and a concomitant reduction in system administration complexity. Birnbaum, essentially, is a system and method for implementing a hierarchical policy for computer system administration that is flexible in assigning policies to managed objects. Birnbaum requires system administrators to define policies by specifying expressions that describe the constraints for the attributes of a class of managed objects. Like Lemuzeaux, Birnbaum does not automatically undertake actions to bring the network into compliance. And it also does not analyze network security policy compliance actions undertaken to determine ineffectual policies to modify and then automatically implement a different network security policy.

Finally, U.S. Pat. No. 6,070,244 to Orchier, entitled "Computer Network Security Management System," describes a method and system for controlling computer security. The system is a centralized, computer-network security management tool capable of handling many different kinds of equipment in a standardized format despite differences in the computer security features among the diverse range of computer equipment in the computer network. The invention uses a layered software architecture, including a technology specific layer and a technology independent layer. The technology specific layer serves to extract and maintain security data on target platforms and for converting data to and from a common data model used by the technology independent layer. The technology independent layer handles the main functionality of the system such as locating and removing certain present and former employees from computer access lists, auditing system user data, monitoring security events (e.g., failed login attempts), automatically initiating corrective action, interfacing with the system users, reporting, querying and storing of collected data's invention are prior art. Orchier automatically takes actions, changes system parameters to be meet an established policy. However, the invention does not take the step of analyzing network security policy compliance actions undertaken to determine ineffectual policies to modify and then automatically implement a different network security policy.

The disclosures of each of the aforementioned references are herein incorporated into the Specification of the Present Invention in their entireties.

Due to the above-referenced disadvantages, there is a need for network communications software programs that offers robust policy compliance assistance, policy effectiveness monitoring and reporting. Further, there is also a need for an automated system to assist policy enforcement officers with proper policy enforcement procedure, and methods to measure policy effectiveness, appropriateness, user system activity and compliance.

SUMMARY OF THE INVENTION

To overcome the limitations in the references described above, and to overcame other limitations that will become apparent upon reading and understanding the Present Invention, the Present Invention discloses a method and apparatus for maintaining policy compliance on a computer network. A system in accordance with the principles of the Present Invention performs the steps of electronically monitoring network user compliance with a network security policy stored in a database, electronically evaluating network security policy compliance based on network user compliance and electronically undertaking a network policy compliance action in response to network security policy non-compliance. The network policy compliance actions may include automatically implementing a different network security policy selected from network security policies stored in the database, generating policy effectiveness reports and providing a retraining module to network users.

One embodiment of the Present Invention includes a method for maintaining policy compliance on a computer network. The method comprises the steps of electronically monitoring network user compliance with a network security policy stored in a database; electronically evaluating network security policy compliance based on the network user compliance; automatically undertaking a network policy compliance action in response to the network security policy compliance; automatically analyzing network security policy compliance actions undertaken to determine ineffectual policies to modify; and automatically implementing a different network security policy and confirming the policy change.

Another embodiment of the Present Invention includes an apparatus for maintaining policy compliance on a computer network. The apparatus comprises a computer system comprising at least one processor and at least one memory. The computer system is adapted and arranged for electronically monitoring network user compliance with a network security policy stored in a database; electronically evaluating network security policy compliance based on the network user compliance; automatically undertaking a network policy compliance action in response to the network security policy compliance; automatically analyzing network security policy compliance actions undertaken to determine ineffectual policies to modify, and automatically implementing a different network security policy and confirming the policy change.

A third embodiment of the Present Invention includes an article of manufacture for maintaining policy compliance on a computer network. The article of manufacture comprises a computer-readable storage medium having a computer program embodied therein that causes the computer network to perform the steps of electronically monitoring network user compliance with a network security policy stored in a database; electronically evaluating network security policy compliance based on the network user compliance; automatically undertaking a network policy compliance action in response to the network security policy compliance; automatically analyzing network security policy compliance actions undertaken to determine ineffectual policies to modify, and automatically implementing a different network security policy and confirming the policy change.

These and other various advantages and features of novelty that characterize the Present Invention and the various embodiments disclosed herein are pointed out with particularity in the Claims, which are annexed hereto and which form a part hereof. However, for a better understanding of the Present Invention, its advantages and the objects obtained by its use, reference should be made to the Figures which form a further part hereof, and to the accompanying Detailed Description Of The Present Invention, in which there is illustrated and described specific examples in accordance with the embodiments of the Present Invention.

BRIEF DESCRIPTION OF THE FIGURES

Referring now to the Figures, in which like reference numbers represent corresponding parts throughout:

FIG. 2 is a block diagram illustrating the steps performed by the policy training module according to an embodiment of the Present Invention;

FIG. 18 is an exemplary screen display illustrating the suggested policy according to an embodiment of the Present Invention;

FIG. 21 is an exemplary screen display illustrating policy writing according to an embodiment of the Present Invention;

FIG. 22 is an exemplary screen display illustrating the network user discussion options according to an embodiment of the Present Invention;

FIG. 25 is an exemplary screen display illustrating the policy exam according to an embodiment of the Present Invention;

FIG. 26 is an exemplary screen display illustrating a training feedback and evaluation form according to an embodiment of the Present Invention;

FIG. 28 is an exemplary screen display illustrating an Appropriate Use Agreement/Employee Agreement Form according to an embodiment of the Present Invention;

FIG. 29 is an exemplary screen display illustrating the end of the training according to an embodiment of the Present Invention;

FIG. 31 is an exemplary screen display illustrating the User Profile according to an embodiment of the Present Invention;

FIG. 36 is an exemplary screen display illustrating Network Non-Compliance Notice according to an embodiment of the Present Invention;

FIG. 40 is an exemplary screen display illustrating a policy knowledge query according to an embodiment of the Present Invention;

FIG. 41 is an exemplary screen display illustrating a policy compliance violation report according to an embodiment of the Present Invention;

FIG. 43 is an exemplary screen display illustrating a System Violation Notice Email and Snail Mail Notice according to an embodiment of the Present Invention;

FIG. 44 is an exemplary screen display illustrating a Subsequent Action Report according to an embodiment of the Present Invention;

FIG. 46 is an exemplary screen display illustrating policy effectiveness reports according to an embodiment of the Present Invention;

FIG. 47 is an exemplary screen display illustrating policy effectiveness reports according to an embodiment of the Present Invention;

FIG. 48 is an exemplary screen display illustrating a policy effectiveness action according to an embodiment of the Present Invention.

DETAILED DESCRIPTION OF THE INVENTION

In the following description of the exemplary embodiments, reference is made to the accompanying Figures that form a part hereof, and in which is shown by way of illustration various embodiments in which the Present Invention may be practiced. It is to be understood that other embodiments may be utilized and that structural changes may be made without departing from the scope of the Present Invention.

Figure 1:
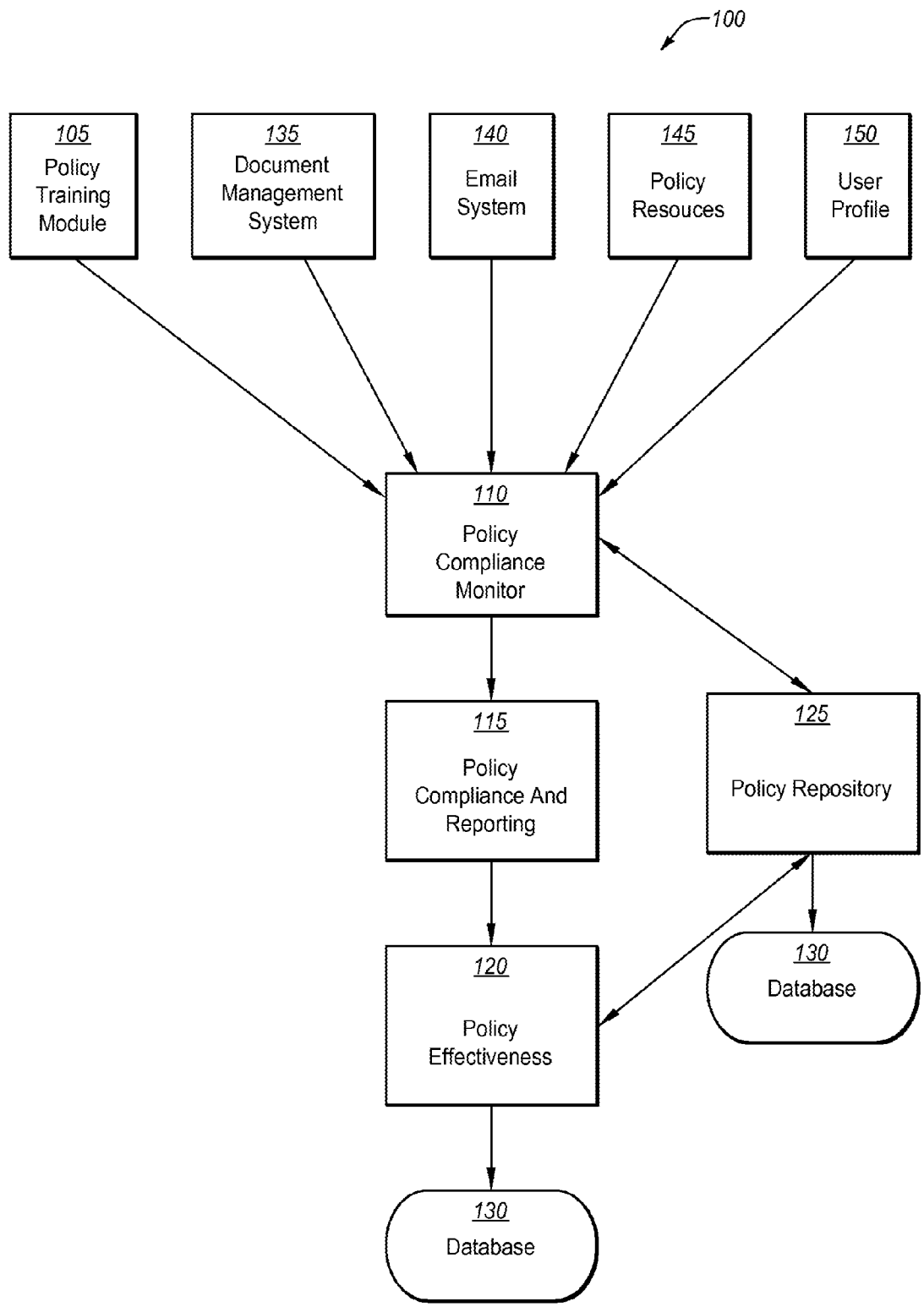
FIG. 1 is a block diagram illustrating a policy effectiveness system according to an embodiment of the Present Invention.

The Present Invention provides a method and apparatus for maintaining policy compliance on a computer network. FIG. 1 is a block diagram illustrating policy effectiveness system 100 according to an embodiment of the Present Invention. The hardware generally implementing policy effectiveness system 100 may include computers, having processors and memories distributed over a network as is well-known in the art. The memory may include RAM or fixed storage. The program steps implementing the Present Invention are stored in the memory and executed by the computer processor. The Present Invention may be implemented using an intranet-based application that can be stored on central servers, waiting to be called up and manipulated via a web browser from any location. Those skilled in the art will recognize that a variety of configurations can be used without departing from the scope of the Present Invention and that a wide variety of distributed and multi-processing systems may be used. Each of the blocks of FIG. 1 will be introduced, followed by a detailed explanation of each block.

Block 105 represents a policy training module for developing network security policies.

Block 110 represents a policy compliance monitor for monitoring compliance across the network.

Block 115 represents the policy compliance and reporting module for managing information received from the compliance monitor.

Block 120 represents the policy effectiveness module for managing policy training module 105 and compliance monitor 110.

Block 130 represents the database for storing policy and compliance information for policy effectiveness system 100.

Block 135 represents the document management system of compliance monitor 130.

Block 140 represents the email compliance system of compliance monitor 130.

Block 145 represents the policy resource module for storing and managing policy resources.

Block 150 represents the user profile module for storing user information.

Policy Training Module

Policy training module 105 typically is an interactive, multimedia policy awareness training program that helps employees gain a better understanding of the basic concepts of network security, email and the Internet. Policy training module 105 presents the network user with a suggested network policy that the organization may wish to implement. Policy training module 105 is designed to help the user understand potential risks that an organization faces if a policy is not implemented, the potential advantages and disadvantages of the policy, and the management and ethical principles affecting the potential policy in question. The network policies are generated by guidelines created from network user feedback obtained during a training session.

Policy training module 105 is comprised of several templates. When the system is first implemented, policy consultants may work with management personnel within an organization to determine the organization's policies for the initial training sessions. The initial policies are entered into policy training database 130 and are the foundation for the initial training programs. After the initial policy training session, policy effectiveness system 100 will analyze all of the information gathered from the areas it monitors and compare it to network user profiles 150 to determine the policy training needs of individual network users. Policy effectiveness system 100 then customizes the policy training materials for the user training sessions.

To access policy training materials, the user is prompted to enter a password and hardware token. The user may be shown a hypertext list of policy training options. The training options may include entering a policy training session, reviewing for a policy exam or taking a policy exam.

Policy Training Session

The policy training session may combine interactive multimedia, group policy development discussions or policy exercises with individual policy reviews and feedback screens. The results are typically network user generated policy guidelines for network security policies.

In one embodiment, the computer screen for the policy training session is divided into three frames. The divided screen gives the user the option to review and answer policy recommendation questions, see and participate in group policy discussions and pause the interactive group policy discussion session. After pausing the interactive group policy discussion session, the user may review dynamic policy recommendations and statistics from previous policy training sessions, request additional information on a topic or subject presented during a previous policy session or seek technical and product support.

Policy training module 105 collects and records both individual and group policy recommendations. Policy training module 105 uses pre-loaded policy recommendations as a benchmark for network users to use during the policy creation training sessions. The policies created from the training sessions may be used to generate policy training effectiveness reports.

Figure 10:
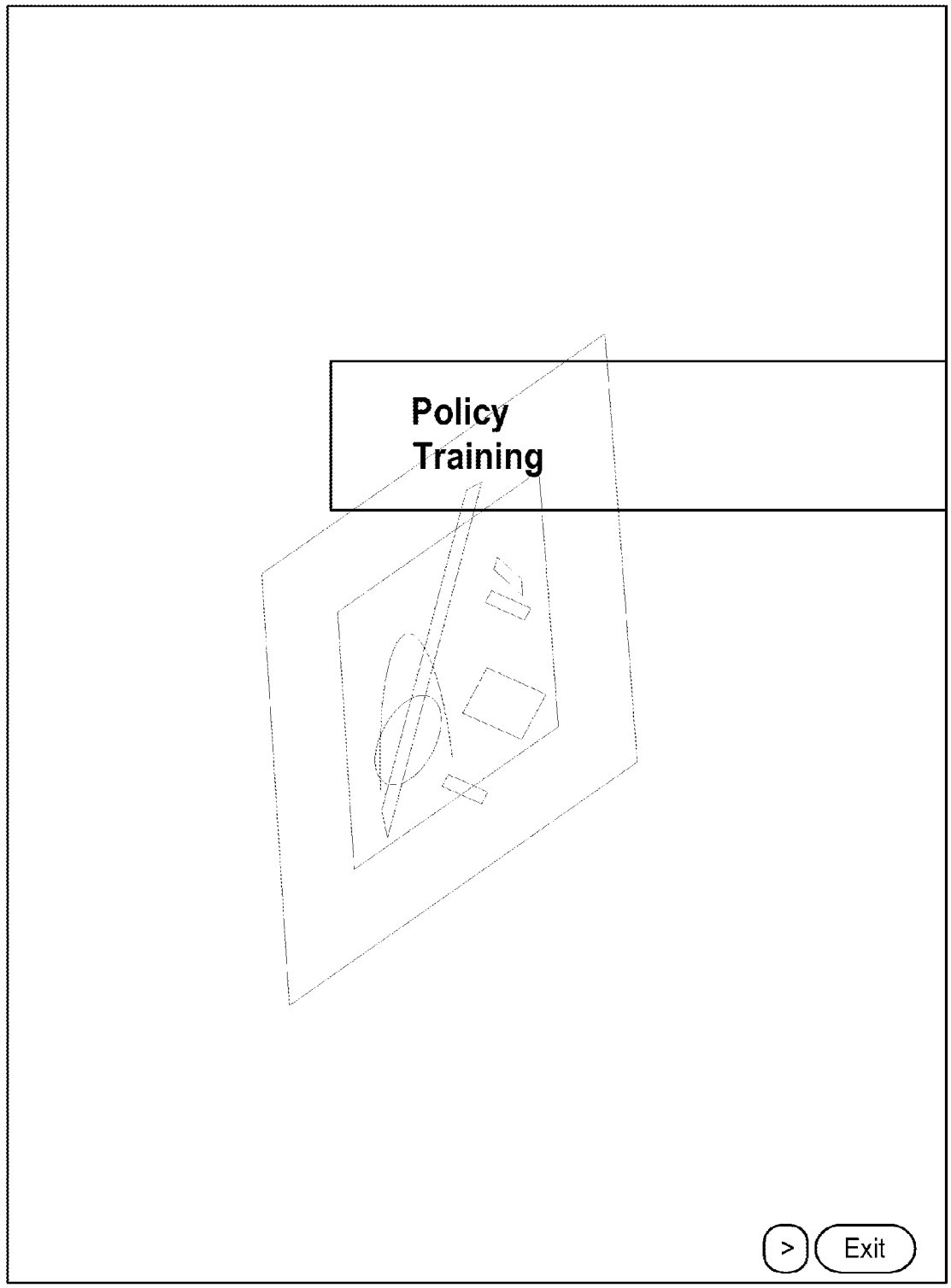
FIG. 10 is an exemplary screen display illustrating the opening screen for policy training according to an embodiment of the Present Invention.
Figure 11:
FIG. 11 is an exemplary screen display illustrating the terms of the software licensing agreement according to an embodiment of the Present Invention.
Figure 12:
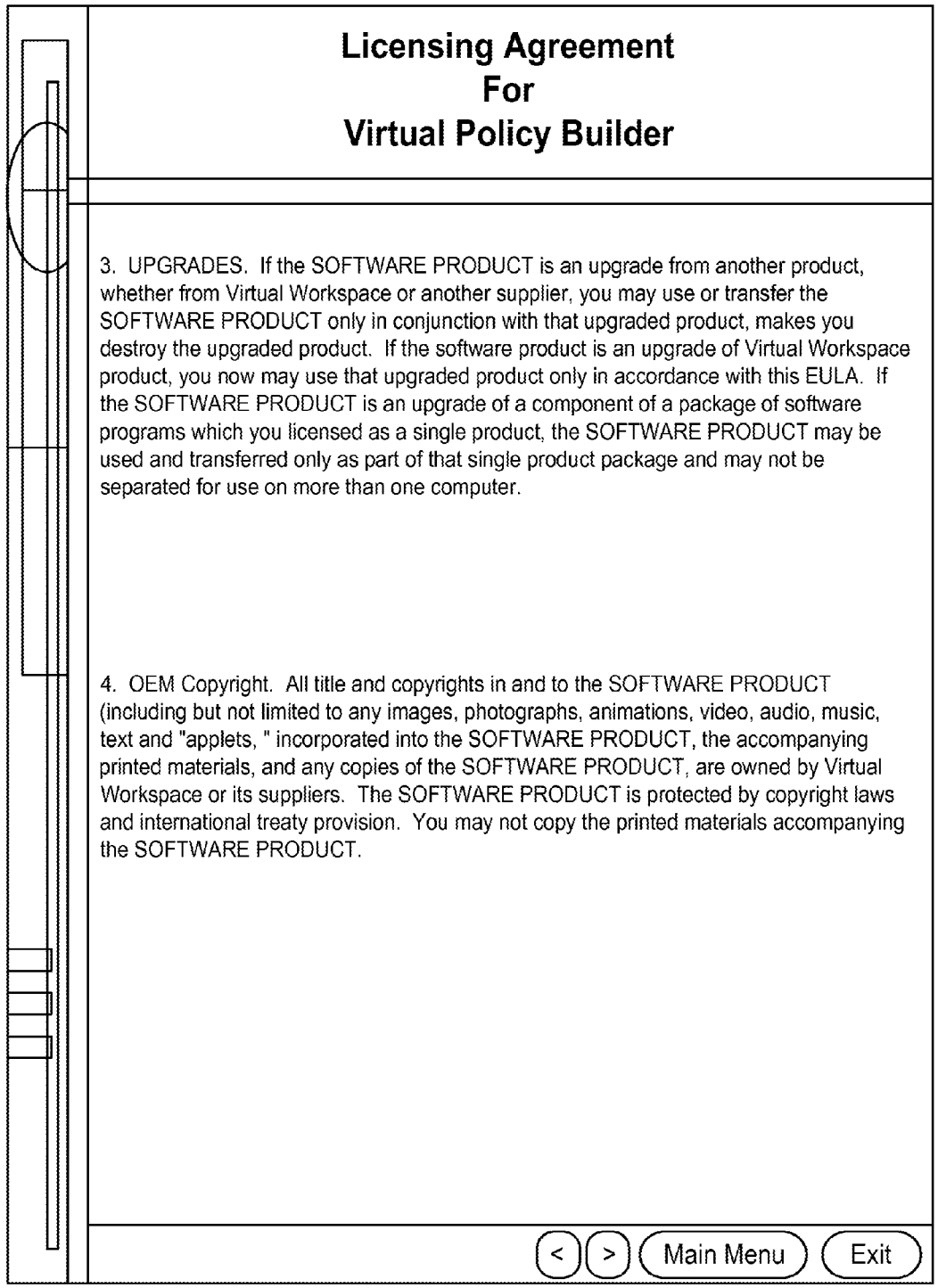
FIG. 12 is an exemplary screen display illustrating the terms of the continuation of the software licensing agreement according to an embodiment of the Present Invention.
Figure 13:
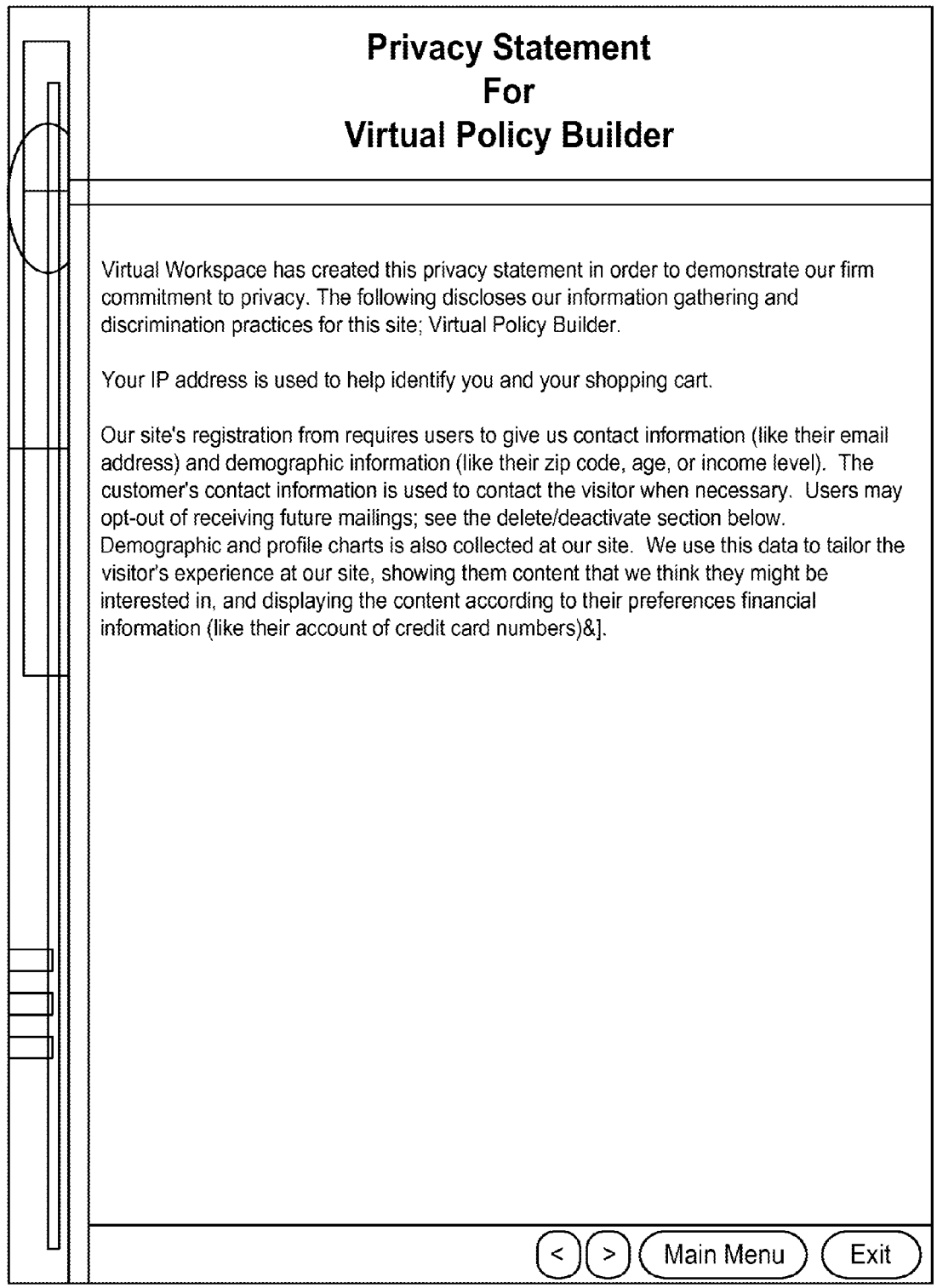
FIGS. 13 and 14 are exemplary screen displays illustrating the terms of the privacy agreement according to an embodiment of the Present Invention.
Figure 14:
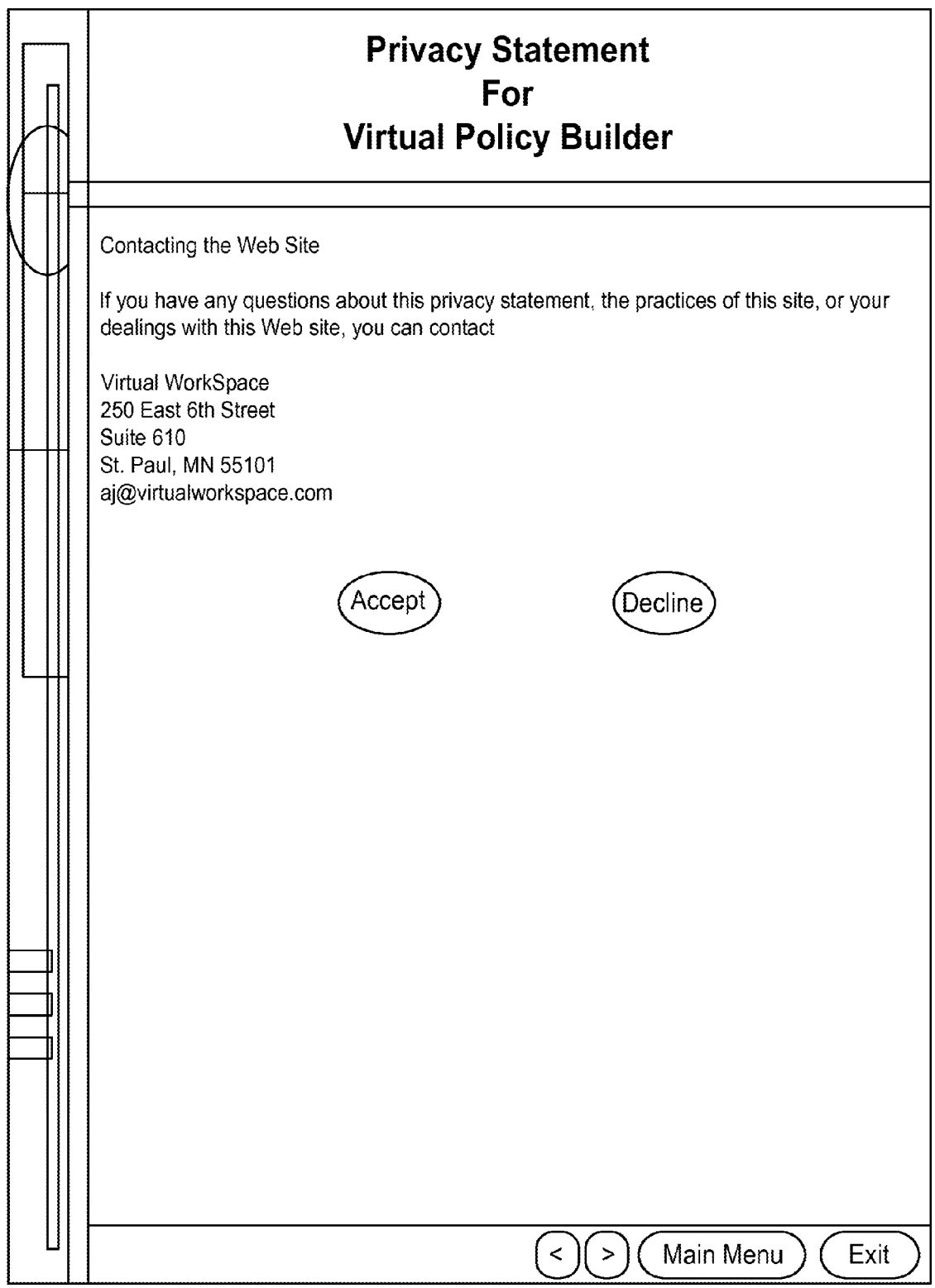

FIG. 2 is a block diagram illustrating the steps performed by the policy training module according to an embodiment of the Present Invention. Block 200 represents the beginning of the policy training process. FIG. 10 is an exemplary screen display illustrating the opening screen for policy training according to an embodiment of the Present Invention. The user may be asked to read a licensing agreement and indicate if he accepts or declines the terms of the agreement by clicking on the appropriate icon. FIG. 11 is an exemplary screen display illustrating the terms of the software licensing agreement according to an embodiment of the invention. FIG. 12 is an exemplary screen display illustrating the terms of the continuation of the software licensing agreement according to an embodiment of the Present Invention. A message stating the privacy rights of the user typically remains on the screen until the user accepts the terms of the privacy message. FIGS. 13 and 14 are exemplary screen displays illustrating the terms of the privacy agreement according to an embodiment of the Present Invention.

Figure 15:
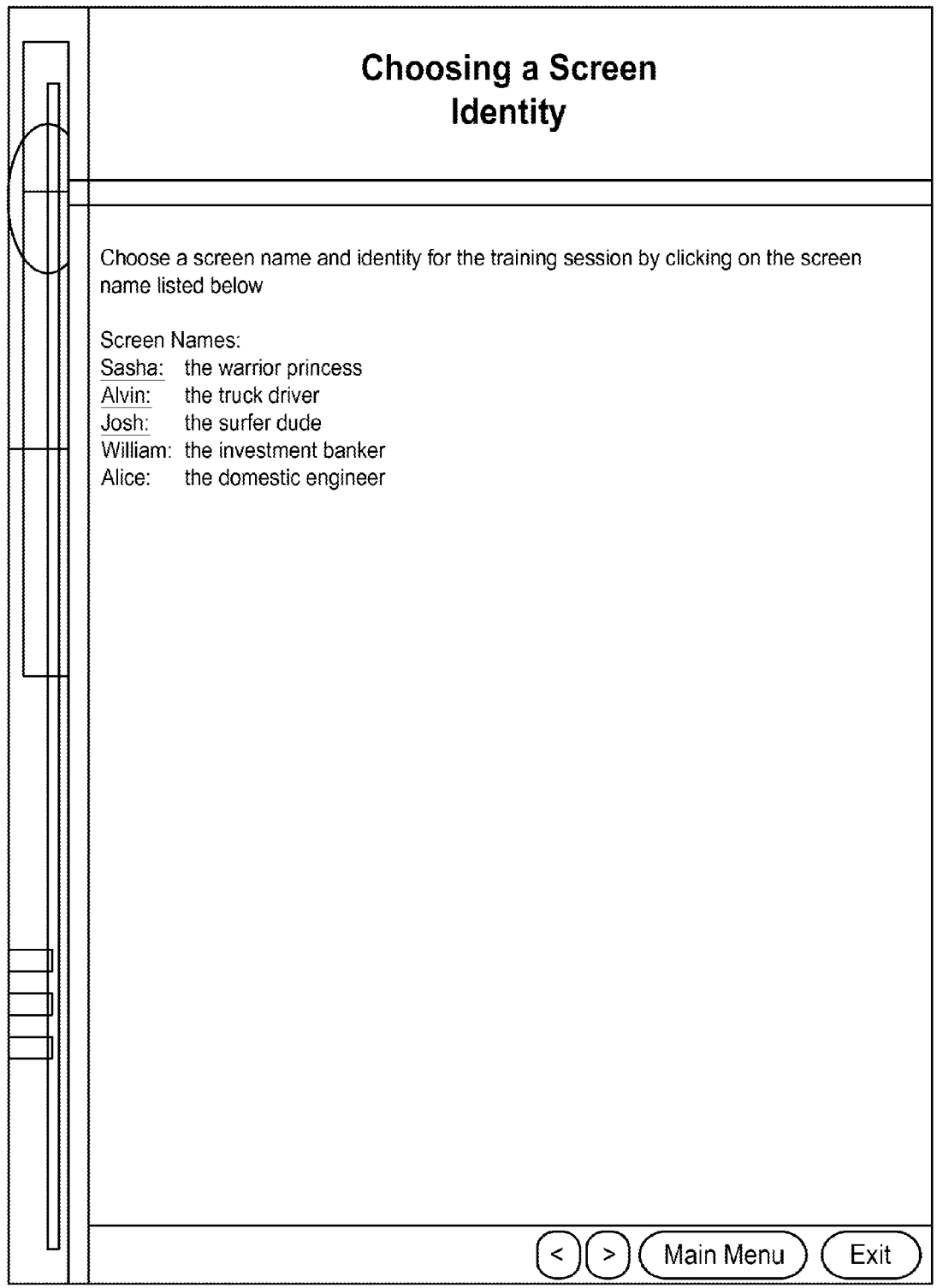
FIG. 15 is an exemplary screen display illustrating the choosing a screen identity according to an embodiment of the Present Invention.

Block 202 represents the policy training module 105 presenting the network user with screen personality options. A screen personality represents a person who is participating in the training session under an assumed screen name and identity. The user is typically presented with a screen and is asked to choose a screen name and identify a screen personality for the training session. A screen personality gives users greater privacy and the freedom to answer policy questions without fear of retaliation from others participating in the program. FIG. 15 is an exemplary screen display illustrating the choosing a screen identity according to an embodiment of the Present Invention.

Block 204 represents the act of policy training module 105 recording the network user's screen personality in the policy effectiveness database.

Figure 16:
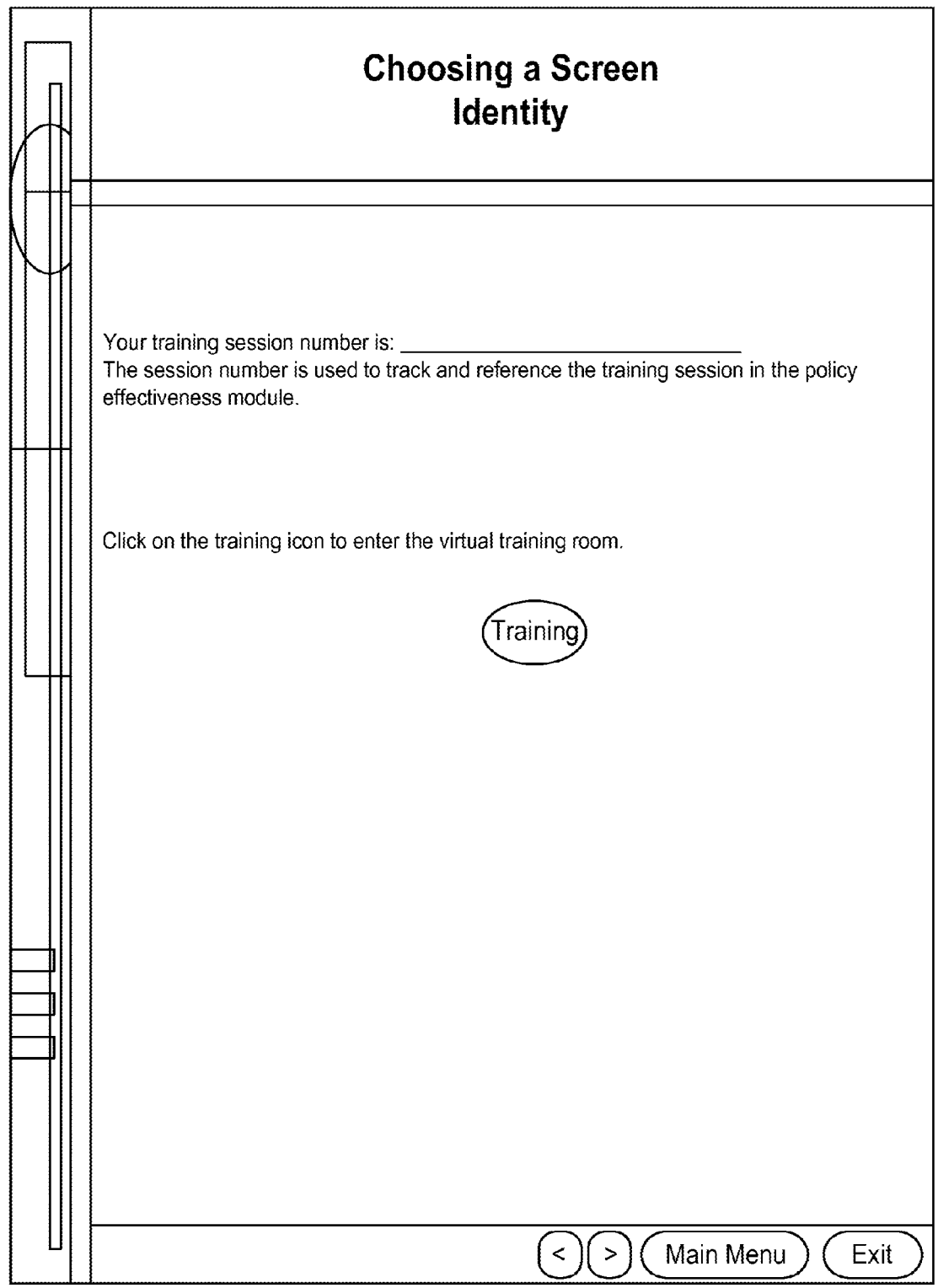
FIG. 16 is an exemplary screen display illustrating assigning the user a session number according to an embodiment of the Present Invention.

Block 204 represents the policy training module 105 assigning the user a session number. FIG. 16 is an exemplary screen display illustrating assigning the user a session number according to an embodiment of the Present Invention.

Block 206 represents the act of policy training module 105 recording the network user's session number. The session number may be used to track and reference the training session in the policy effectiveness module.

Block 208 represents the act of policy training module 105 presenting the network user with a virtual training room. The user may be prompted to click on an icon to enter the virtual training room. The virtual training room is similar to an Internet chat room.

Figure 17:
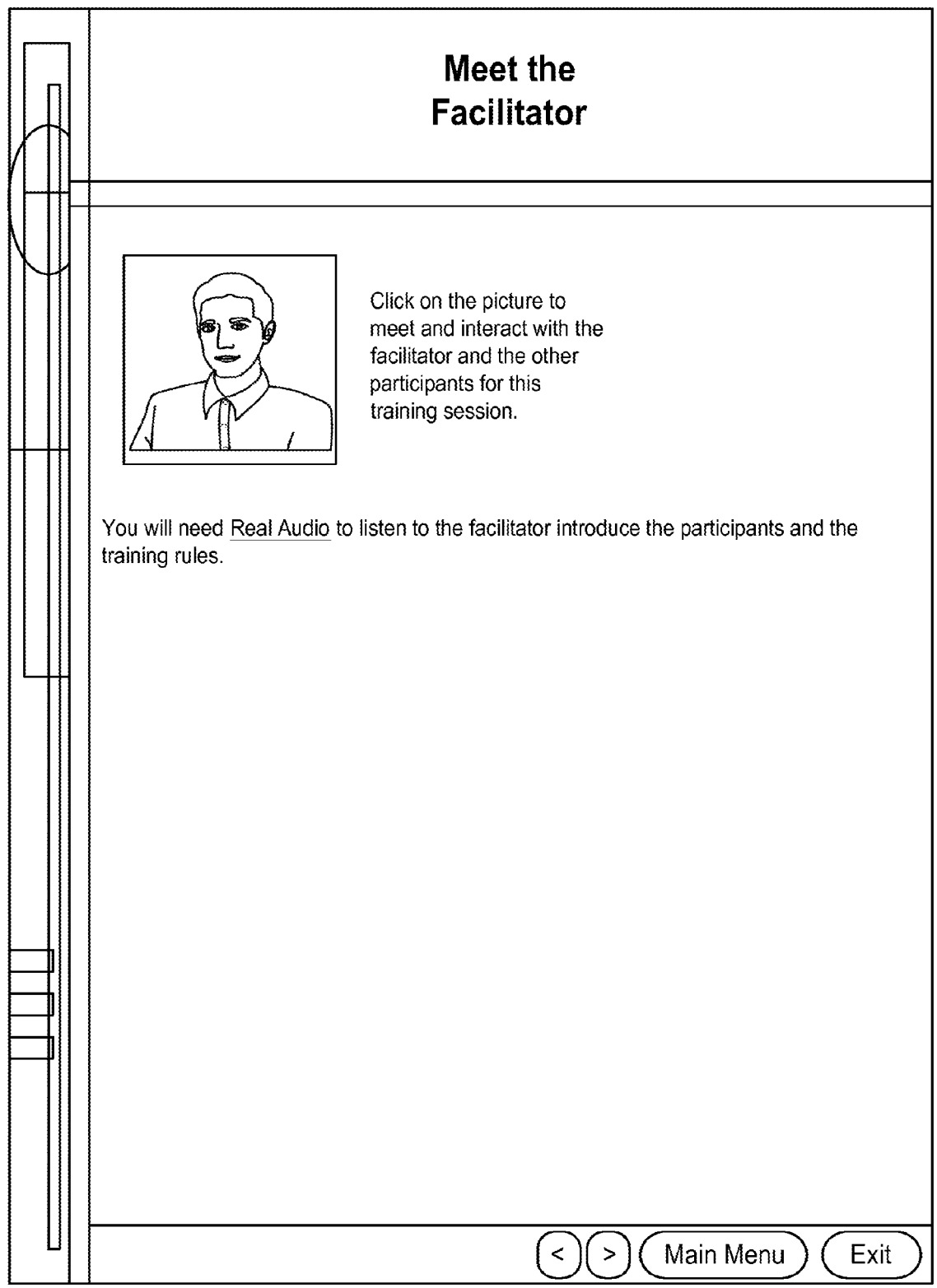
FIG. 17 is an exemplary screen display illustrating the introduction to the virtual facilitator according to an embodiment of the Present Invention.

Block 208 represents the act of policy training module 105 presenting a virtual facilitator. In a preferred embodiment, the user may be introduced to the program's virtual facilitator who may introduce the training participants to each other, explain the training rules, and ensure the training program remains on schedule. The virtual facilitator is typically stored in policy training database 130. FIG. 17 is an exemplary screen display illustrating the introduction to the facilitator according to an embodiment of the Present Invention.

In the preferred embodiment, a maximum of Five (5) screen personalities can participate per training session. Block 212 is a decision block representing the policy training module 105 that determines if there are less than Three (3) participants registered for a session. Block 220 represents the act of policy training module 105 that determines the number of virtual personalities needed for the system. If there are less than three (3) participants registered for a system, then control is passed to decision block 214. The system monitors the number of screen personalities registered for a training session. The system may record each user's training session including the user's policy suggestions, individual feedback and onscreen comments provided during a training session. Block 222 of the system generates a virtual personality to participate in the training session. A virtual personality may be implemented by completing the field of a template that may include information copied from a previous user's training session. If policy training module 105 determines that a virtual personality is needed for the training session, then the present system may be implemented so that the module 105 launches an algorithm to generate a virtual personality to participate in the training session. The algorithm copies information from the policy recommendation database 224 stored in database 130. Block 226 represents the policy training module 105 storing the virtual personality in the database 224. The policy recommendation database 224 is comprised of policy information previously submitted by a network user via a screen personality including policy suggestions, individual feedback and onscreen comments provided during previous training sessions. Virtual personality information obtained during previous training session is retrieved from the policy recommendation database 224. The algorithm copies the policy information from the previous policy modules and then positions and scripts the policy information for the training session. The script is defined as positioning and pacing the policy information per policy module to make it appear as though it is occurring in real-time. This provides the user with a virtual personality that is interactive and simulates a real-time training experience without the user being dependent upon the availability of others for interaction, discussion and training. After introductions, the user is typically prompted to click on either an agree or disagree icon to indicate his understanding of the training rules and to indicate his readiness to proceed. Block 220 represents the policy training module 105 generating a policy.

Block 214 is a decision block representing the policy training module 105. It determines if there are more than Five (5) screen personalities registered for the session. If there are more than Five (5), screen personalities registered, then Block 216 represents the policy training module 105 dividing the participants into two groups for policy training. If there are Five (5) of less screen personalities registered, then control is passed to Block 220 which represents the policy training module 105 generating a policy training session. Block 216 represents the policy training module 105 assigning the participants a new session number.

The Policy Training Process

Figure 3A:
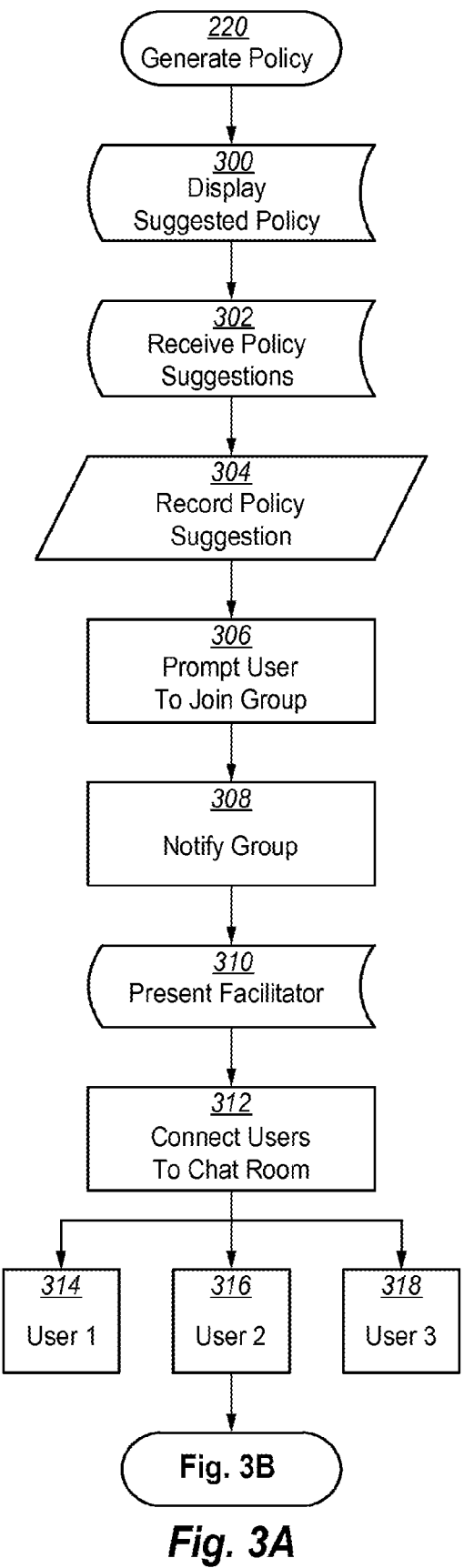
FIGS. 3A-3C are block diagrams further illustrating the steps performed by a policy training module according to an embodiment of the Present Invention.
Figure 3B:
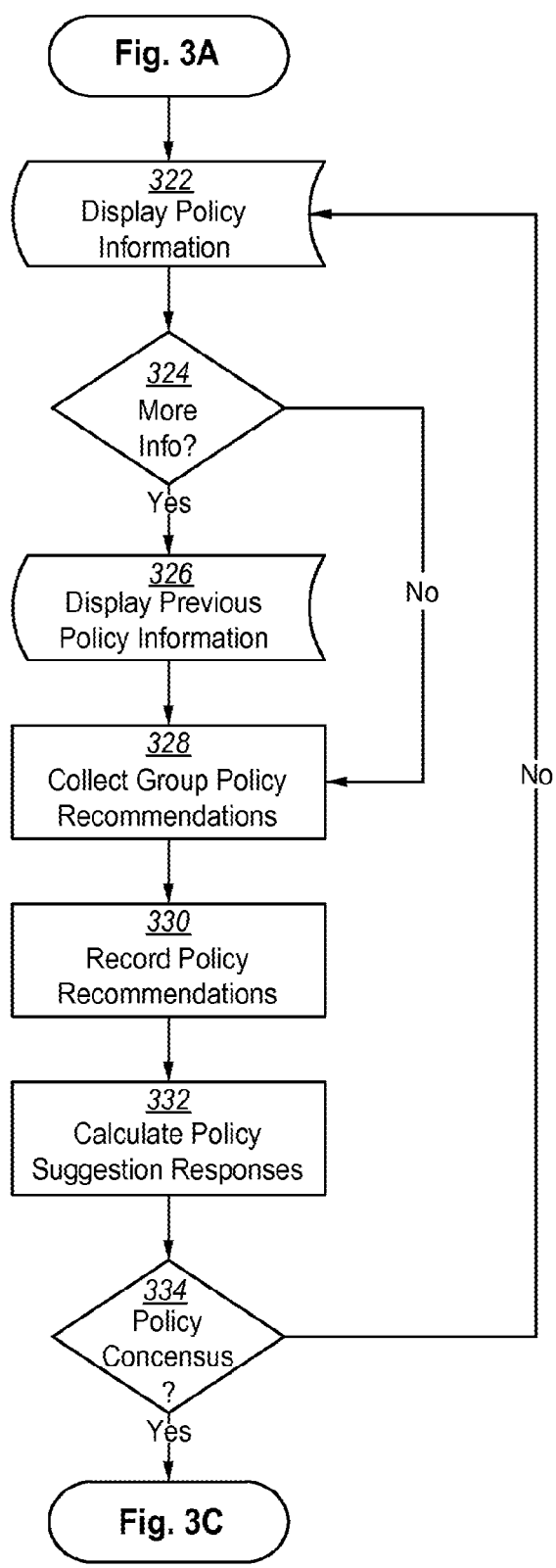
Figure 3C:
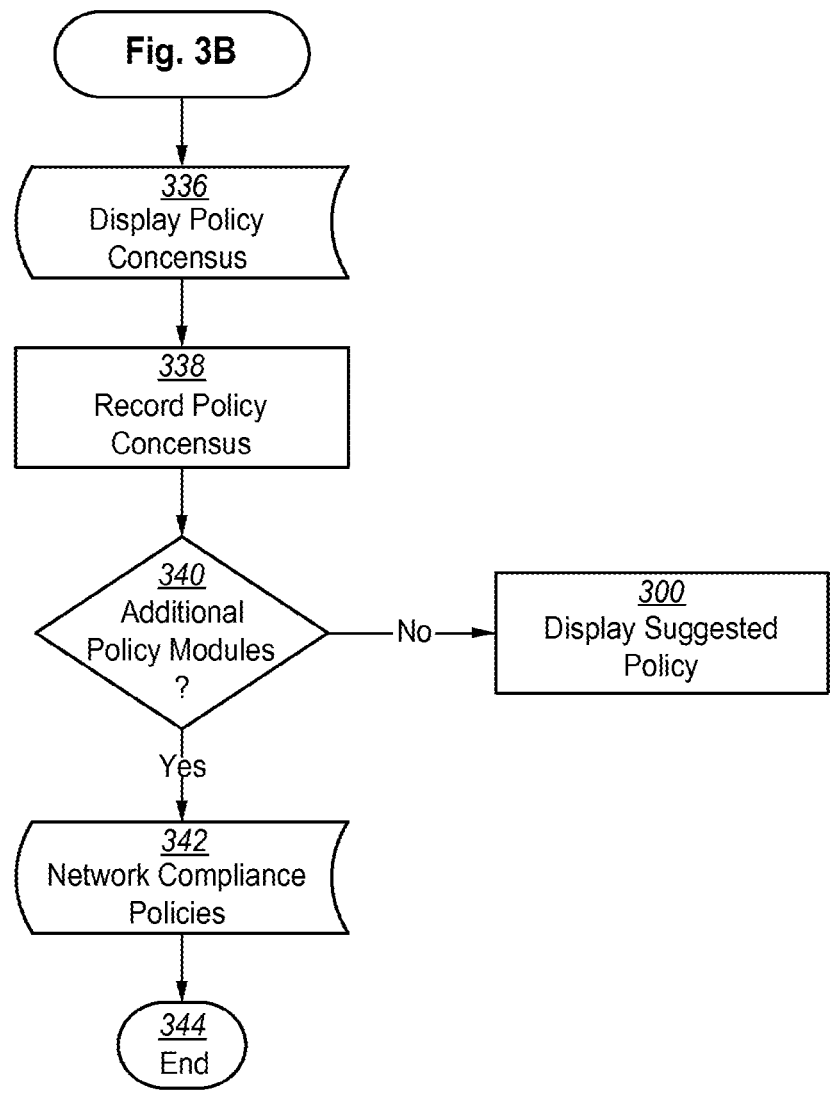

FIGS. 3A-3C are block diagrams further illustrating the steps performed by policy training module 105 in performing the generation of a network security policy step represented by Block 220 according to an embodiment of the Present Invention.

Block 300 represents the policy training module 105 indicating that the network user is ready to begin policy training. The system presents the network users with suggested policy information.

Block 302 represents the policy training module 105 receiving suggested policies from network users. FIG. 18 is an exemplary screen display illustrating the suggested policy according to an embodiment of the Present Invention. The suggested policy information typically is stored in policy training database 130. The user is asked to review the policy information and a policy suggestion for a limited period of time. Policy training module 105 collects a policy suggestion from each network user's policy review session.

Block 304 represents the policy training module 105 recording all individual policy recommendations.

Figure 19:
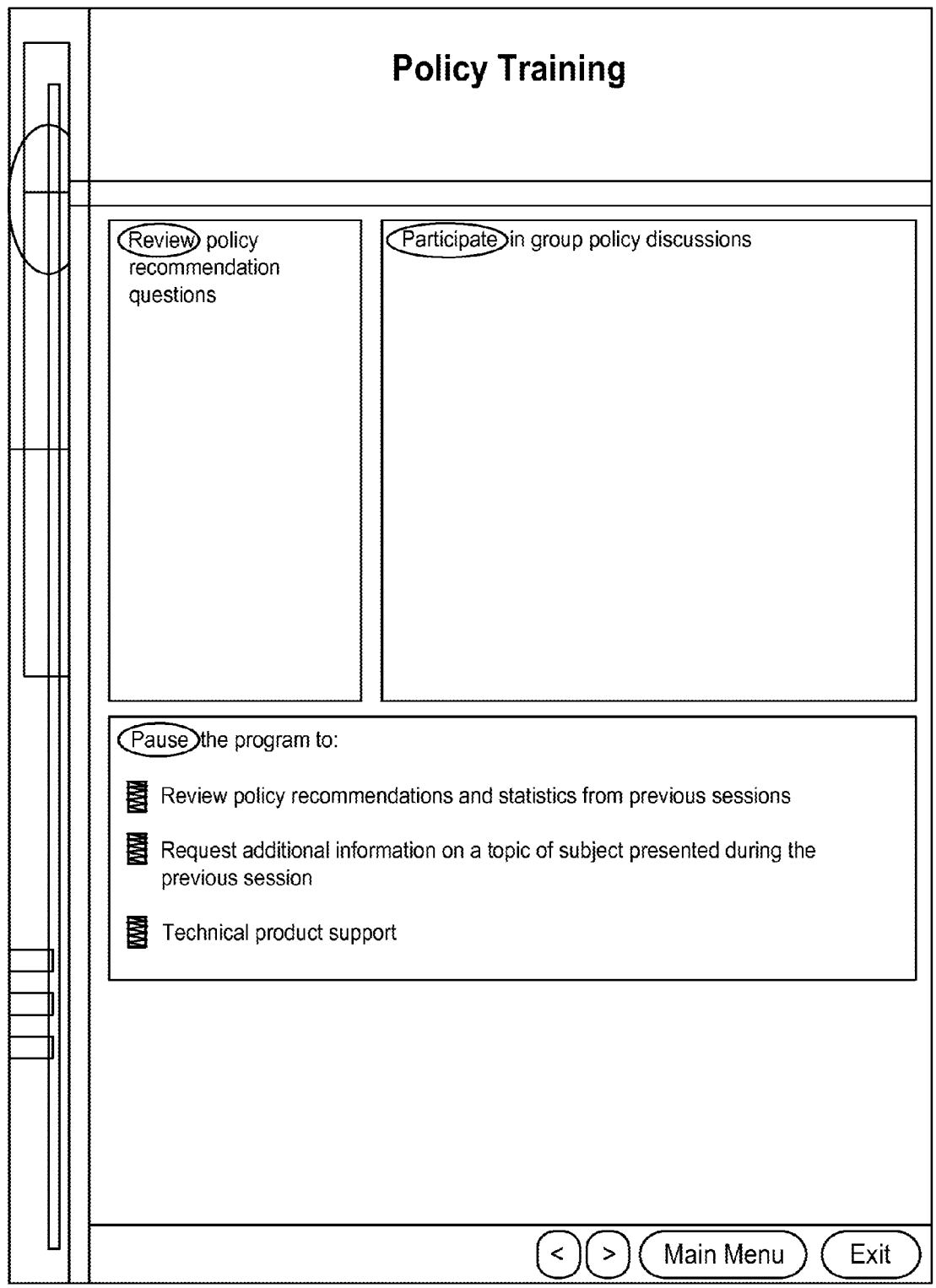
FIG. 19 is an exemplary screen display illustrating the network user discussion options according to an embodiment of the Present Invention.

Block 306 represents the policy training module 105 prompting the network user to join a group discussion after the network user has reviewed the information on his own. The network user indicates his readiness to join the group discussion by clicking an icon. The network user's signal may be sent to other participants' screens. FIG. 19 is an exemplary screen display illustrating the network user discussion options according to an embodiment of the Present Invention.

Block 308 represents the policy training module 105 notifying the other participants that a network user is prepared to enter a group session. Once the individual network users are ready to discuss the policy, the facilitator begins the session monologue and monitors the session's content and time.

Block 310 represents the policy training module 105 retrieving the electronic facilitator from database 120. The electronic facilitator serves as a moderator for the training module. The electronic facilitator may prompt the users for input and monitors the time spent on each issue.

Block 312 represents the policy training module 105 connecting individual network users to the policy training chat room.

Blocks 314, 316 and 318 represent the individual network user connecting to the policy chat room of the policy training module 105. One or more individual network user's policy recommendations may be displayed to the group.

Figure 20:
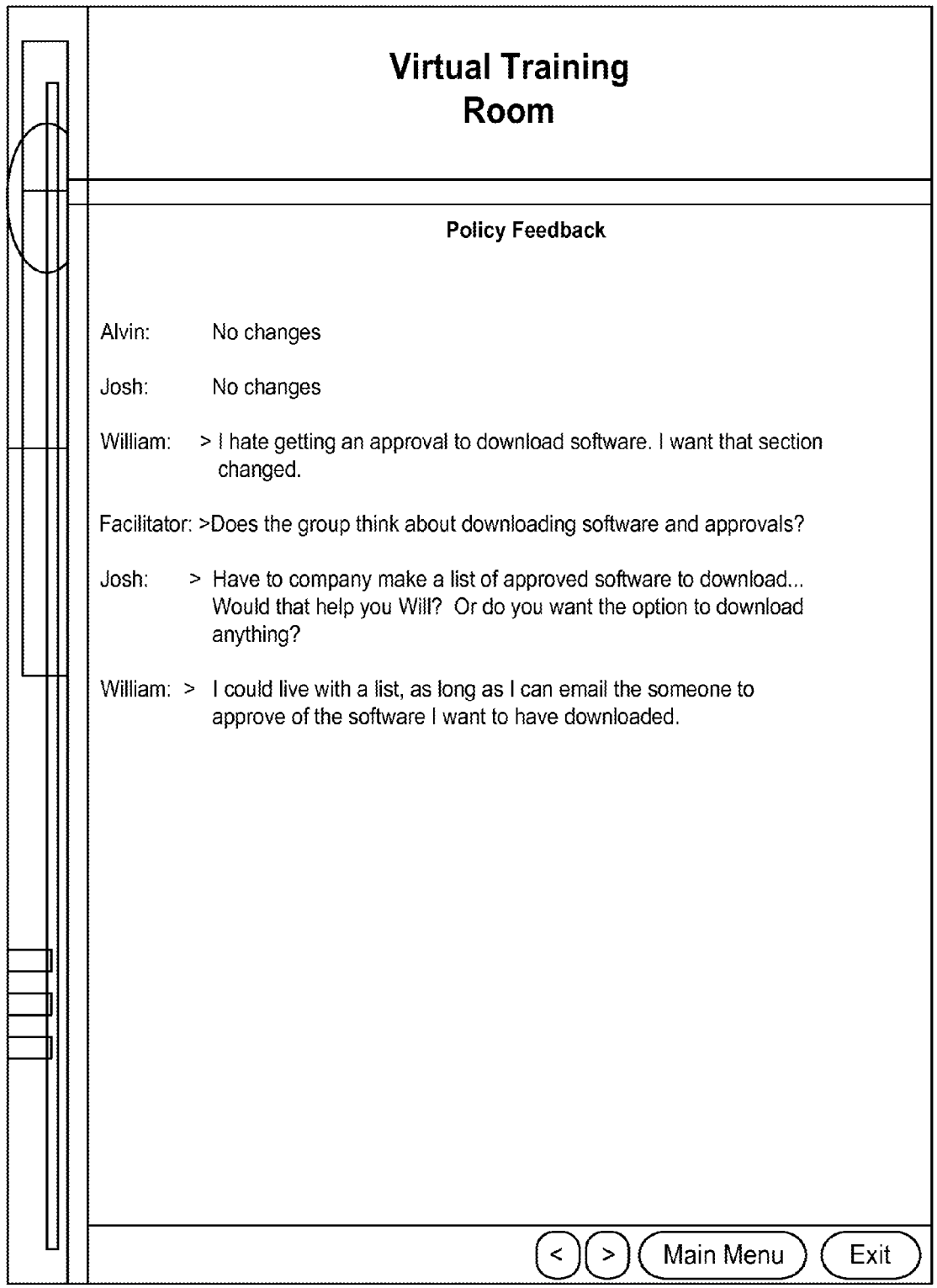
FIG. 20 is an exemplary screen display illustrating group policy discussions according to an embodiment of the Present Invention.

Block 322 represents the policy training module 105 displaying network user policy recommendations to the group. The policy recommendations may be shown in a different color and font. FIG. 20 is an exemplary screen display illustrating group policy discussions according to an embodiment of the Present Invention. The individual recommendations are used to develop group policy consensus. From the discussion, the group confers, online, to write a policy recommendation. All group participants can view the policy recommendations and group discussions from previous policy training sessions. FIG. 21 is an exemplary screen display illustrating policy writing according to an embodiment of the Present Invention.

Block 324 is a decision block representing the policy training module 105 querying the user regarding whether he wants more policy information. If so, Block 326 represents the policy training module 105 retrieving the policy training information and displaying it to applicable network users. Block 328 represents the policy training module 105 collecting policy recommendations from the group. The group confers online to write a policy recommendation. Policy training module 105 collects and records all group policy recommendations. FIG. 22 is an exemplary screen display illustrating the network user discussion options according to an embodiment of the Present Invention.

Block 330 represents the policy training module 105 recording the group policy recommendations in the policy recommendation database 224.

Block 332 represents the policy training module 105 calculating and ranking the group responses in the policy training database. For example, the policy with the most user votes may be the policy of group consensus.

Block 334 is a decision block representing the policy training module 105 determining if a policy consensus has been achieved. If policy consensus has been achieved, then Block 336 represents the policy training module 105 displaying the group consensus. If consensus is not achieved, then control may be returned to Block 322. If there is a tie for group consensus, then the system requires network users to review the policy options and re-vote. Each user's policy information is displayed so that the group may reconsider their policy recommendations. Consequently, the group may attempt to come to a group policy consensus.

The process illustrated in Blocks 322 through 334 is repeated until a group policy consensus is achieved.

Figure 23:
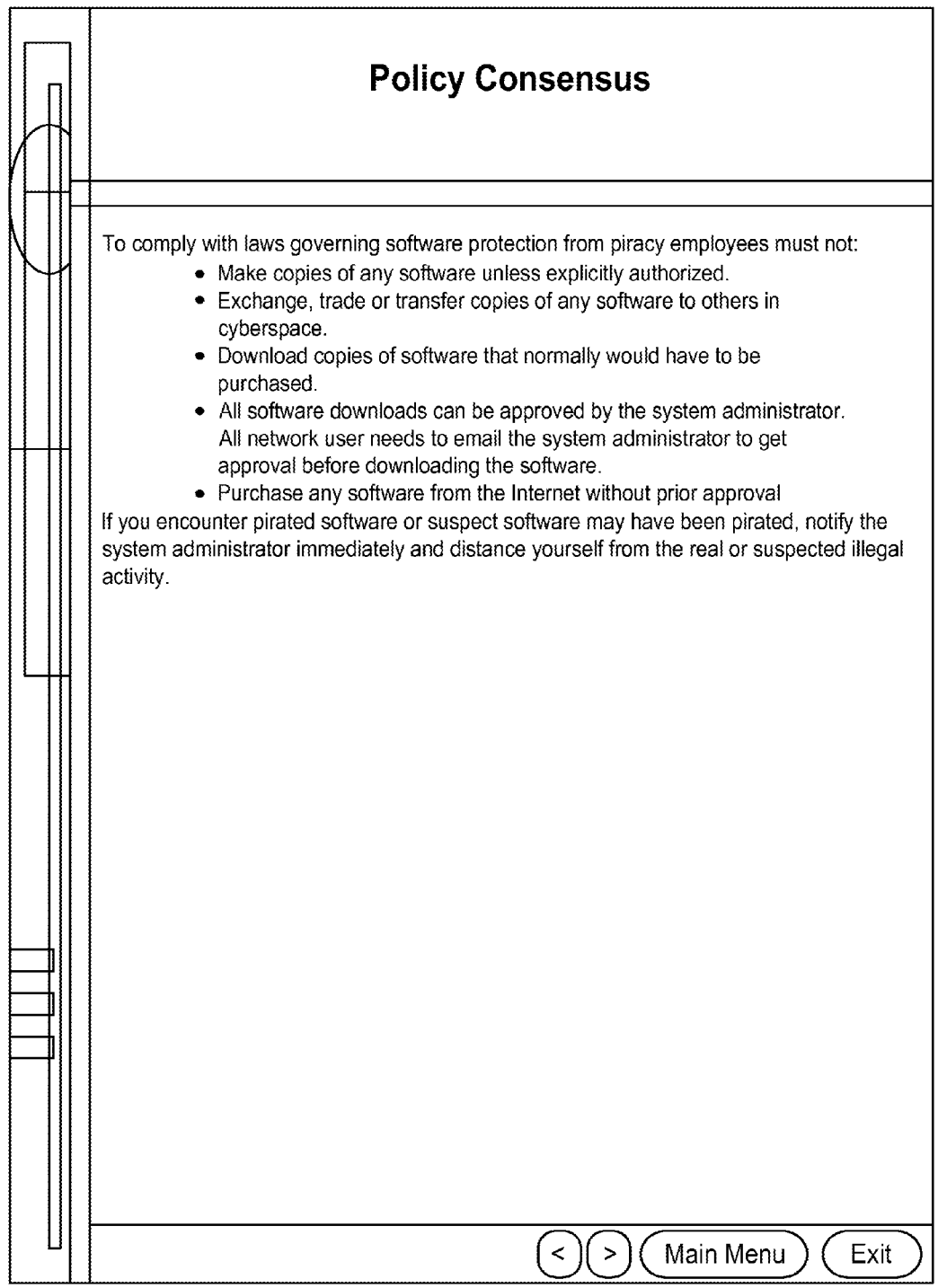
FIG. 23 is an exemplary screen display illustrating the policy consensus according to an embodiment of the Present Invention.

Block 336 represents the policy training module 105 displaying policy consensus. FIG. 23 is an exemplary screen display illustrating the policy consensus according to an embodiment of the Present Invention.

Block 338 represents the policy training module 105 recording the policy consensus. The process of developing a consensus policy is repeated until all of the policy modules have been reviewed and addressed.

Block 340 is a decision block representing the policy training module 105 determining if there are no additional policy modules to complete. If there are additional policy modules to complete, then, Block 300 repeats the policy generation process. If there are no additional policy modules to complete, then Block 342 represents the policy training module 105 presenting a suggested policy to the network user and assembling and recording the group consensus policies from each policy module.

The policy training module 105 assembles and records the group consensus policies from each policy module in the network security policy database 130.

Figure 24:
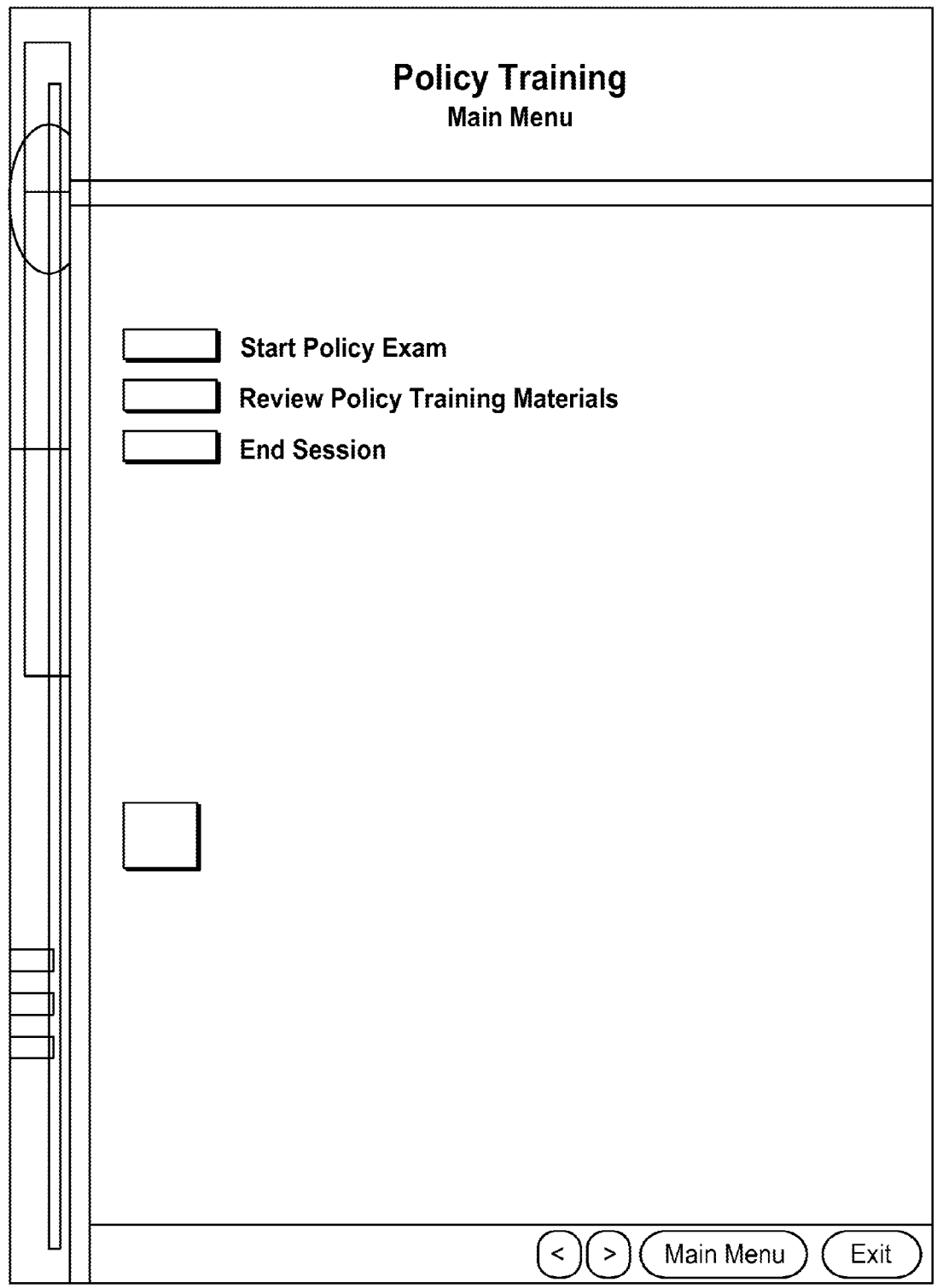
FIG. 24 is an exemplary screen display illustrating the policy training options according to an embodiment of the Present Invention.

Block 344 represents the end of the policy generation process of the policy training module 105. When the policy training session are completed, the network user is given the option to start a policy exam, review policy training materials, or end the session. FIG. 24 is an exemplary screen display illustrating the policy training options according to an embodiment of the Present Invention.

Start the Policy Exam

Figure 4:
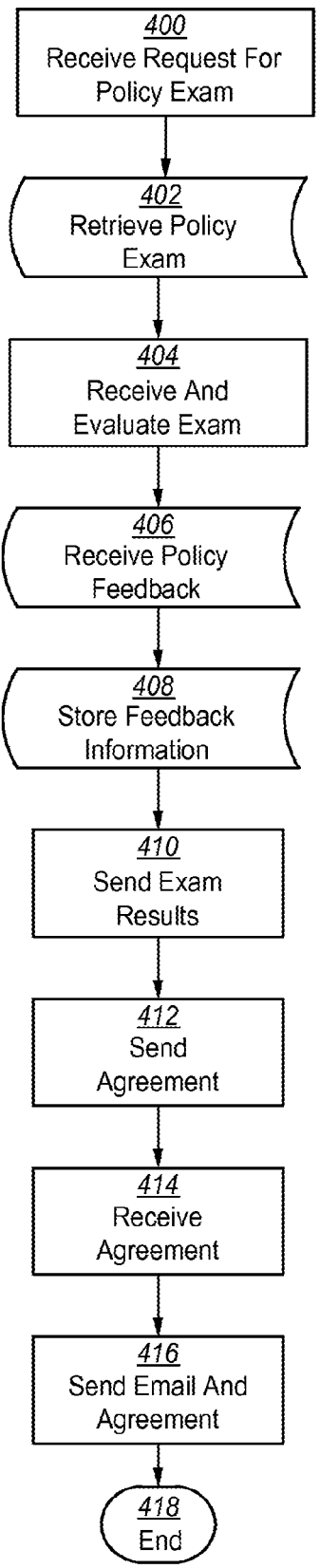
FIG. 4 is a block diagram further illustrating the steps performed by a policy training module in administering a policy training exam.

FIG. 4 is a block diagram further illustrating the steps performed by the policy training module in administering a policy training exam according to an embodiment of the Present Invention. The network user is given an online policy exam to reinforce the information presented in the policy training session.

Block 400 represents the policy training module 105 receiving a request for a policy training exam from the network user.

Block 402 represents the policy training module 105 retrieving a policy exam from the policy training database 130 and presenting it to the network user. FIG. 25 is an exemplary screen display illustrating the policy exam according to an embodiment of the Present Invention. Once the network user completes the exam, he may be prompted to send the exam to policy effectiveness 120 where the network user's exam is recorded.

Block 404 represents the policy training module 105 receiving the exam answers from the network user and tabulating the network user's score. During the exam tabulation period, the network user may be asked to fill out a policy training feedback and evaluation form.

Block 406 represents the policy training module 105 retrieving a policy training feedback and evaluation form from the policy training database 130 and sending it to the network user. FIG. 26 is an exemplary screen display illustrating a training feedback and evaluation form according to an embodiment of the Present Invention. The network user may complete the policy training feedback and evaluation form and return it to the policy training module 105.

Block 408 represents the policy training module 105 storing the policy training feedback and evaluation form in the User's Profile database 150.

Block 410 represents the policy training module 105 sending the network user his exam score after the feedback and evaluation form is completed.

Figure 27:
FIG. 27 is an exemplary screen display illustrating an Appropriate Use Agreement/Employee Agreement form according to an embodiment of the Present Invention.

After the network user completes the policy building session, the policy training module 105 may request that the user sign an Appropriate Use Agreement/Employee Agreement to limit the organization's liability. FIG. 27 is an exemplary screen display illustrating an Appropriate Use Agreement/ Employee Agreement form according to an embodiment of the Present Invention. FIG. 28 is an exemplary screen display illustrating an Appropriate Use Agreement/Employee Agreement form according to an embodiment of the Present Invention. Block 412 represents the policy training module 105 sending the network user an Appropriate Use Agreement/ Employee Agreement. The network user reads and signs the Agreement. The network user returns the Agreement to the policy training module 105. The signed Agreement is kept in the User Profile database 200 and a copy is emailed to the user for his records.

Block 414 represents the policy training module 105 receiving the Agreement and storing it in the User Profile 150.

Block 416 represents the policy training module 105 sending an email message to the network user with a copy of the Agreement attached.

Block 418 represents the end of the policy exam process. FIG. 29 is an exemplary screen display illustrating the end of the training according to an embodiment of the Present Invention. If the network user fails the exam, then the policy training module 105 will prompt him to retake the exam, review policy training materials or end the session.

Policy Compliance Monitor

Policy Compliance Monitor 110 works with Policy Effectiveness Module 120 to provide network user compliance monitoring with network security policy stored in a database. It electronically evaluates network security policy compliance based on network user compliance, and undertakes a network policy compliance action in response to user security policy compliance. Network user compliance monitoring is defined as monitoring network activity to insure network users are in compliance with the organization's network security policies. Network security policy is a set of rules designed to limit an organization's risk and liability.

Figure 5:
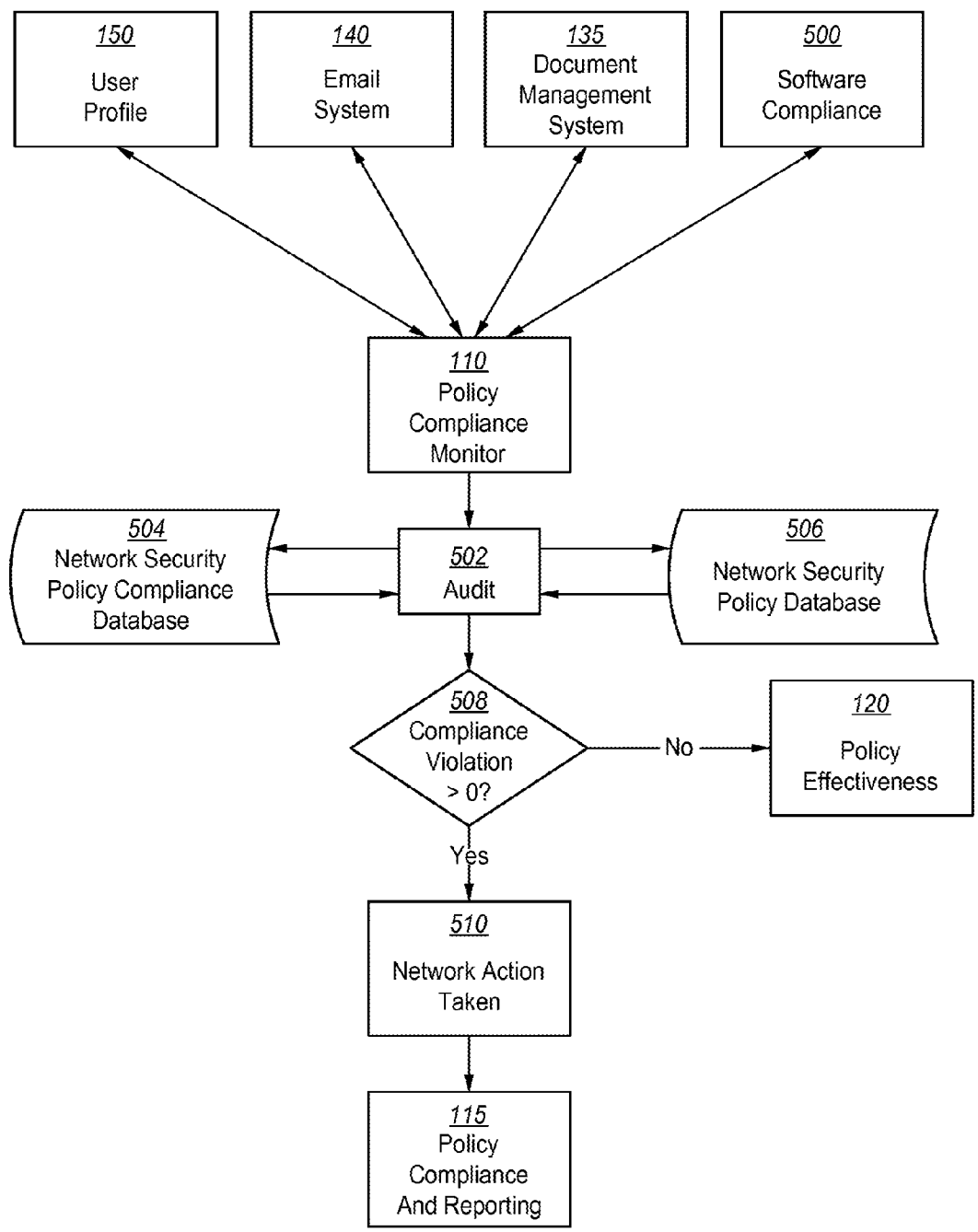
FIG. 5 is a block diagram further illustrating the operation of a policy effectiveness system according to an embodiment of the Present Invention.
Figure 30:
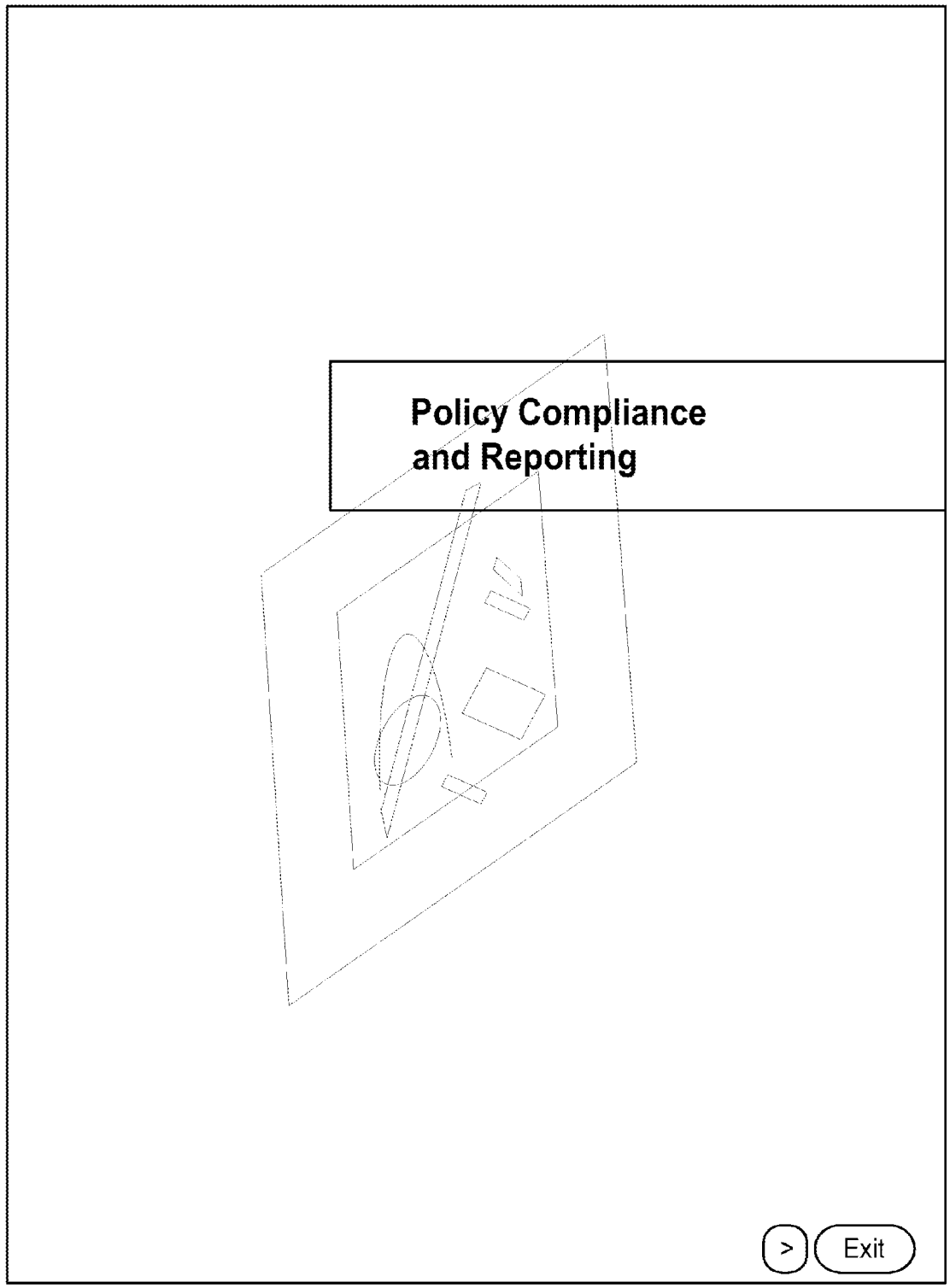
FIG. 30 is an exemplary screen display illustrating the policy compliance and reporting according to an embodiment of the Present Invention.

FIG. 5 is a block diagram further illustrating the operation of the policy effectiveness system according to an embodiment of the Present Invention. Policy compliance monitor 110 oversees user profile, email compliance, internet compliance, document management and software compliance functions to collect network user security policy compliance activities. FIG. 30 is an exemplary screen display illustrating the policy compliance and reporting according to an embodiment of the Present Invention.

Block 110 represents the policy compliance monitor of policy effectiveness system 100.

Block 150 represents the user profile module of policy effectiveness system 100. User profile module 150 is a database comprised of information about network users. For example, the user profile module 150 may contain information about network user policy compliance history, employment history and network identification information. FIG. 31 is an exemplary screen display illustrating the User Profile according to an embodiment of the Present Invention.

Figure 32:
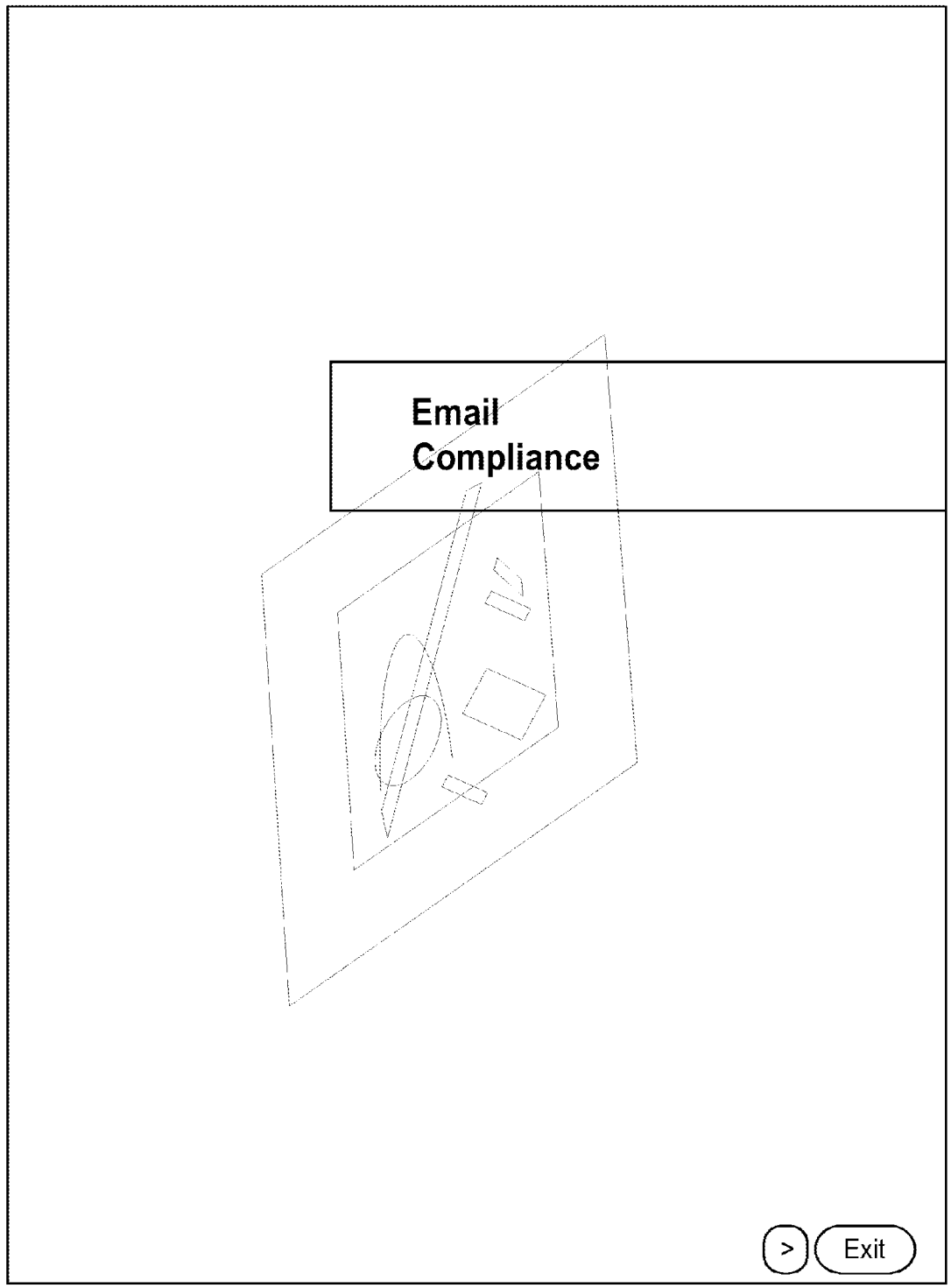
FIG. 32 is an exemplary screen display illustrating Email Compliance according to an embodiment of the Present Invention.

Block 140 represents the email compliance module of policy effectiveness system 100. The email compliance module 140 collects information on network users' email use activity. FIG. 32 is an exemplary screen display illustrating email compliance according to an embodiment of the Present Invention.

Figure 33:
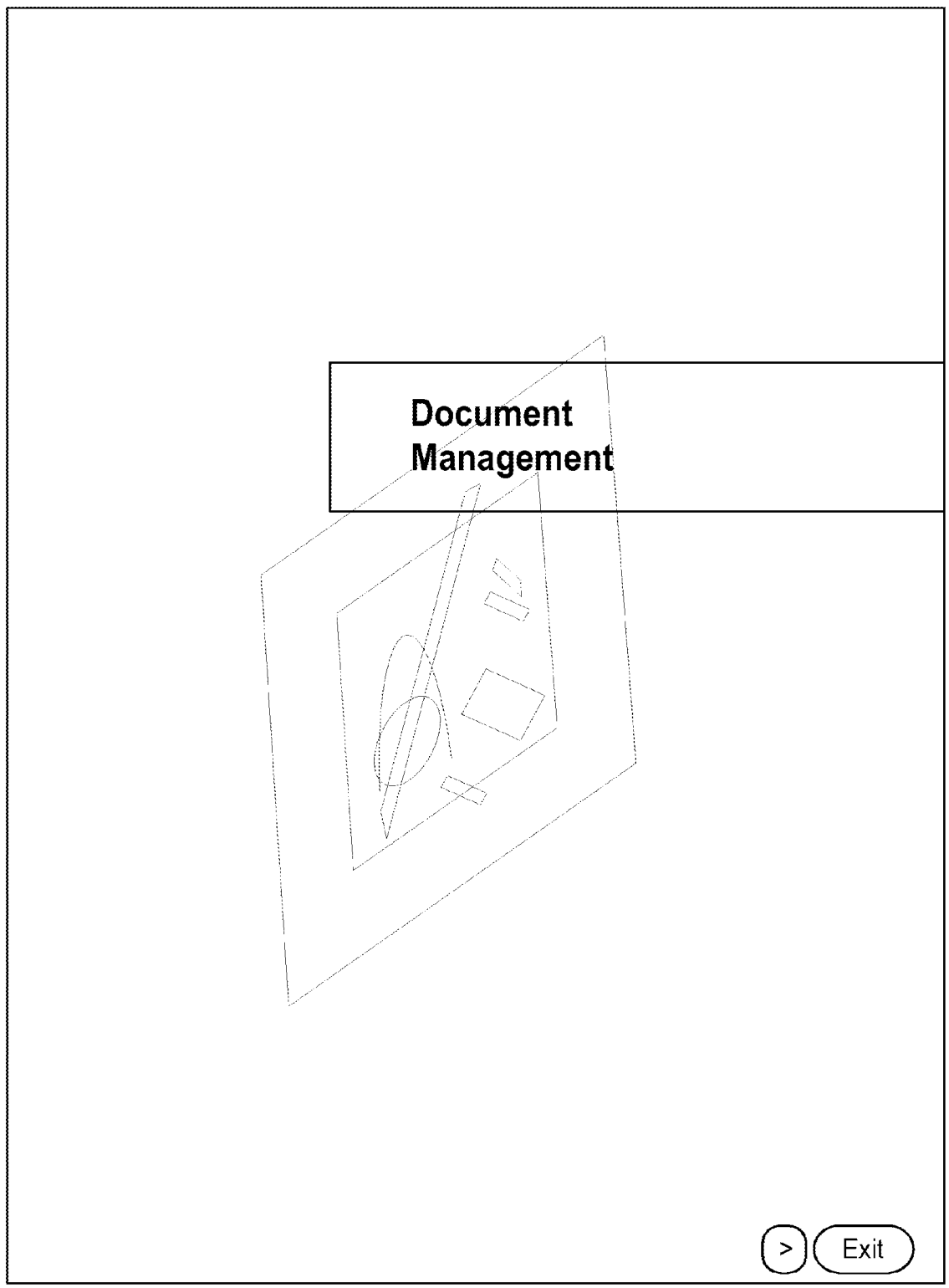
FIG. 33 is an exemplary screen display illustrating Document Management according to an embodiment of the Present Invention.

Block 135 represents the document management module of policy effectiveness system 100. FIG. 33 is an exemplary screen display illustrating document management module 135 according to an embodiment of the Present Invention. Document management module 135 collects information on documents in the system. This may include network user document access history, document version history and document authenticity.

Figure 34:
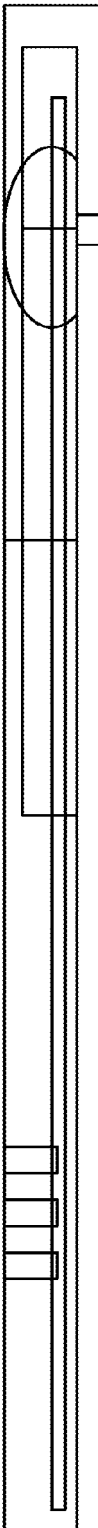
FIG. 34 is an exemplary screen display illustrating Software Compliance according to an embodiment of the Present Invention.

Block 500 represents software compliance module 500 of policy effectiveness system 100. Software compliance module 500 collects information on how network users utilize software on the network. FIG. 34 is an exemplary screen display illustrating Software Compliance according to an embodiment of the Present Invention.

Block 502 represents the audit function of policy effectiveness system 100. The audit function collects information from all of the policies monitored by the policy compliance monitor 110. Each monitored policy is assigned a value representing a target baseline compliance level for network policy compliance ("baseline network policy compliance"). In the preferred embodiment, the numeric value assigned to each monitored policy is 100, representing that for each policy 100% user compliance is required. Each network user compliance activity has a numeric value the system monitors representing a targeted compliance level for user policy compliance ("user policy compliance").

Block 504 represents the network security policy compliance database of the database 130. The baseline compliance level assigned to each monitored policy is stored in network security policy compliance database 504 of the database 130. The audit function is responsible for reviewing network user compliance against baseline network security policy.

Figure 35:
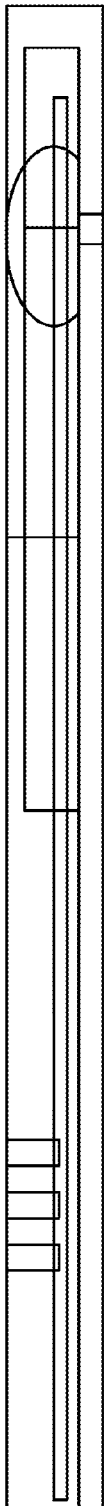
FIG. 35 is an exemplary screen display illustrating the audit function according to an embodiment of the Present Invention.

FIG. 35 is an exemplary screen display illustrating the audit function according to an embodiment of the Present Invention. Block 506 represents the network security policy database. The user policy compliance value is monitored in relation to the baseline network compliance value stored in the network security policy database 506.

Block 508 is a decision block representing the policy effectiveness system 100 analyzing the baseline network policy compliance value in relation to the user compliance policy value. If the user policy compliance value is greater than or equal to the baseline network policy compliance value, then Block 120 represents the policy effectiveness system notifying the policy effectiveness module 120 that the network is in compliance. Otherwise, if the user policy compliance value is less than the baseline network policy compliance value, the policy compliance monitor 110 measures the difference between the baseline network policy compliance value and the user policy compliance value and undertakes a network compliance action in response to the difference. Alternatively, the policy compliance monitor could undertake a network compliance action anytime a policy violation occurs.

FIG. 36 is an exemplary screen display illustrating Network Non-Compliance Notice according to an embodiment of the Present Invention. Each policy is associated with a corresponding group of network policy compliance actions ranging from a level one (e.g., notifying a network user), level two (e.g., notifying the network user and a policy administrator), level three (e.g., providing a retraining module to a network user, restricting a network user's network access fights) and a level four action (e.g., restricting the network user's network access rights). Each network compliance action is assigned a value related to a numeric value that may be reported from monitoring network user compliance. The network compliance action undertaken is based on the severity of the network policy compliance violation; i.e., the difference between the baseline network policy compliance value and the user policy compliance value.

Upon recording the difference between the baseline network policy compliance value and the user policy compliance value, policy compliance and reporting module 115 records this information in network security policy database 506 and undertakes the appropriate network compliance action. For example, an organization may have a personal email use policy. The personal email use policy may limit each network user to sending a maximum of 20 personal email messages per day. The system assigns the numeric value of 95 to the personal email messages policy. A baseline value of 100 is the optimum network policy compliance value. The compliance monitor collects information on network user compliance for personal email use. If an individual sends 25 email messages, the system records a user policy compliance value of 90. The user policy compliance value of 90 is compared to the baseline network policy compliance value of 100. The difference of 10 (100–90) indicates to the policy effectiveness system 100 that a network policy compliance action may be taken. In this example, a network user compliance value of 10 may tell the system to execute a network compliance action.

Figure 37:
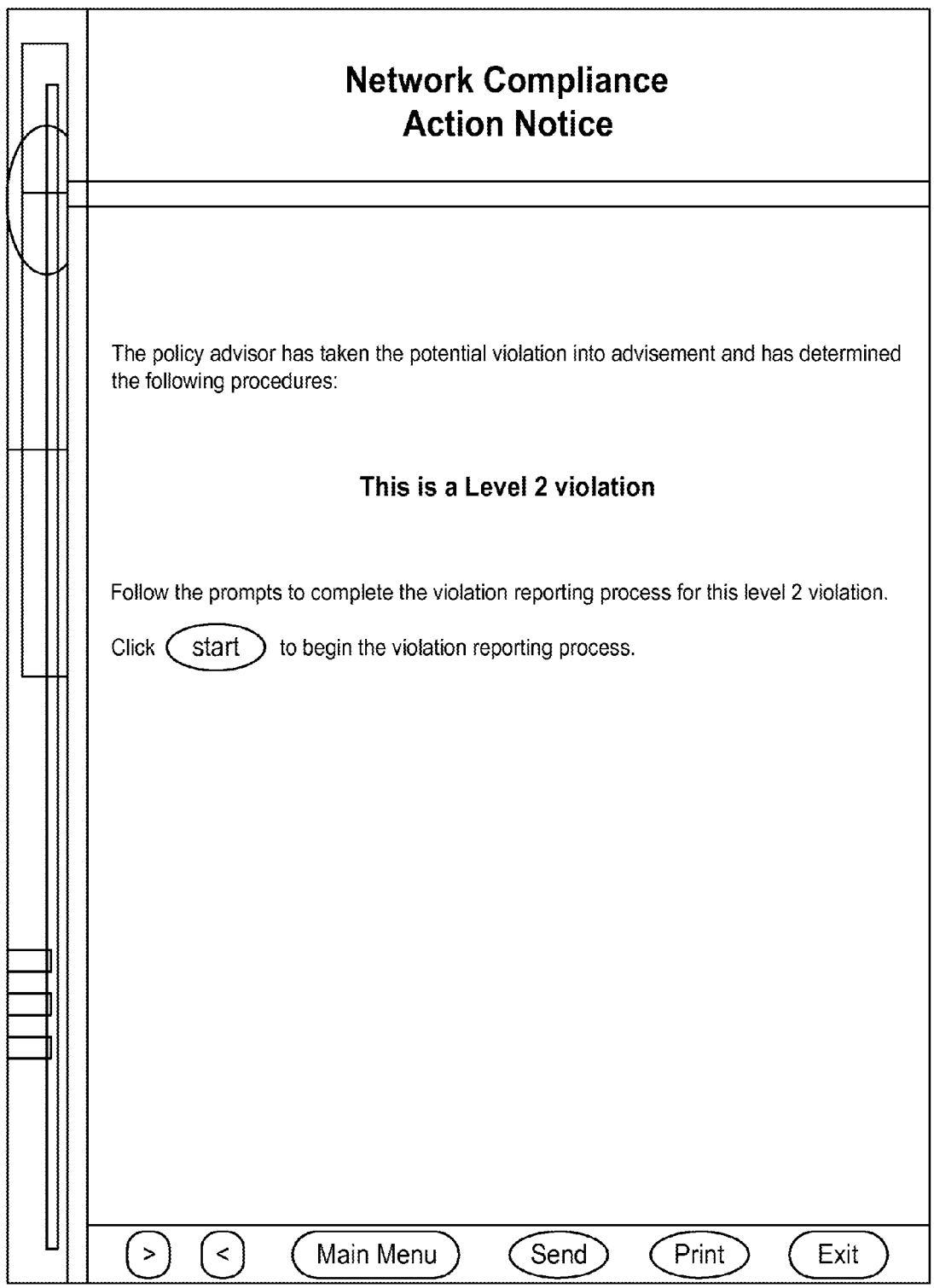
FIG. 37 is an exemplary screen display illustrating a Network Compliance Action Notice according to an embodiment of the Present Invention.

In one embodiment, the system has four action levels. Each action level may be undertaken in response to a range of differences in compliance values. FIG. 37 is an exemplary screen display illustrating a Network Compliance Action Notice according to an embodiment of the Present Invention. At a first action level, the system may send an email notifying the network user to stop the non-compliant activity. At a second action level, the system may prompt the system administrator to follow screen prompts to initiate procedures for a policy violation. Policy effectiveness system 104 notifies the network user and a system administrator. Email and surface mail are automatically sent to the alleged violator and the system administrator. The message may ask the alleged violator to discontinue the inappropriate behavior or to reread an intranet-base policy manual. Policy effectiveness system 100 records if the network user visited the electronic site of the policy manual.

At a third action level, the policy effectiveness system 100 may file a policy violation report and launch an investigation. The policy effectiveness system 140 sends email and surface mail to the alleged violator and the system administrator informing them of the violation. A policy retraining module may be the most likely course of action. At the third action level, an immediate referral is made to the appropriate policy officer for review and action. At the fourth action level, policy effectiveness system 100 may restrict the network user's network access rights and prompt the system administrator to either begin investigation procedures and/or initiate a signal to the policy knowledge base to determine the recommended course of action.

Block 510 represents policy effectiveness system 100 undertaking a network policy compliance action. Policy effectiveness system 100 sends a signal to policy compliance and reporting 115 to record the non-compliant network user activity.

Policy Compliance and Reporting

Policy compliance and reporting module 115 provides automated policy monitoring, policy violation procedures and reporting. It tracks policy investigations and generates policy investigation reports. These procedures work in conjunction with existing policy compliance reporting, discipline and grievance procedures to uphold an organization's compliance policies.

Compliance

Policy compliance and reporting 115 monitors and records user and network system activities audit procedures and reporting, policy violation procedures investigations and reporting and compliance/non-compliance status reporting.

Figure 6:
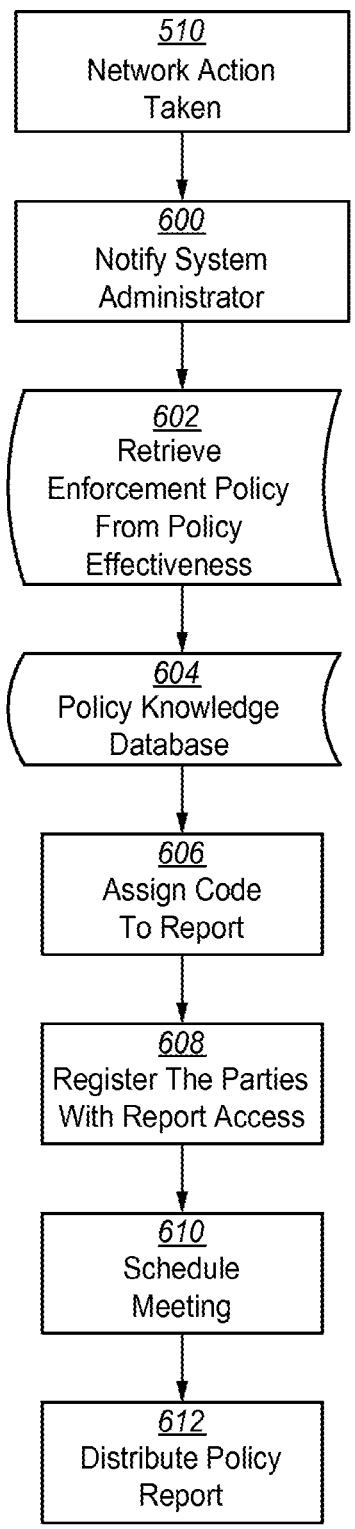
FIG. 6 is a block diagram illustrating the steps performed by a policy compliance and reporting module according to an embodiment of the Present Invention.

FIG. 6 is a block diagram illustrating the steps performed by a policy compliance and reporting module according to an embodiment of the Present Invention. The policy compliance and reporting process begins when policy compliance and reporting 115 receives a signal from compliance monitor 110 that a network compliance action has been taken. Block 510 represents that a network compliance action has been taken by policy effectiveness system 100.

Figure 38:
FIG. 38 is an exemplary screen display illustrating a policy compliance violation report according to an embodiment of the Present Invention.

Block 600 represents policy compliance and reporting 115 sending an email or pager message to the system administrator notifying the administrator that a network user compliance violation has occurred. The email message attaches a policy compliance violation report (file) to the email and instructs the system administrator to follow the compliance reporting procedures. FIG. 38 is an exemplary screen display illustrating a policy compliance violation report according to an embodiment of the Present Invention. The email instructs the system administrator to log into the system, present a password and hardware token to access the policy violation reporting procedures and indicates the screen option to choose. The screen options available to the system administrator may include file a policy compliance violation report, investigate a policy compliance violation report, review audit, system reports, examine an appeal process, review a user profile, access policy resources or policy effectiveness reports.

File a Policy Violation Report

Figure 39:
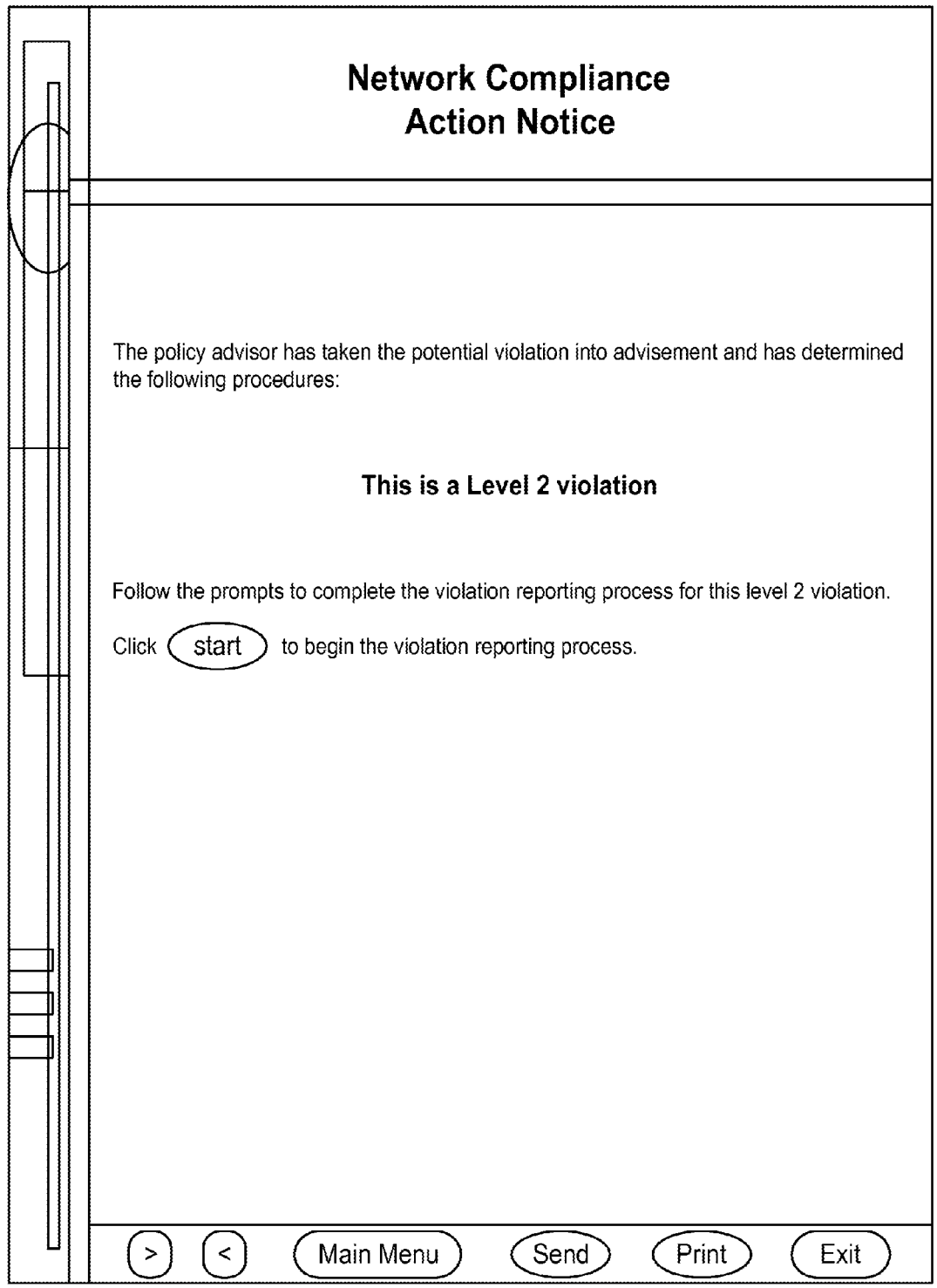
FIG. 39 is an exemplary screen display illustrating a network policy action notice according to an embodiment of the Present Invention.

In a preferred embodiment, a screen is displayed to the system administrator indicating that a network user policy compliance violation and a network user compliance action has occurred. If a level two or greater compliance action has been taken, then the system administrator may be instructed to access the network user policy compliance violation information to document the violation. FIG. 39 is an exemplary screen display illustrating a network policy action notice according to an embodiment of the Present Invention.

Block 503 represents the policy compliance and reporting 115 retrieving the network user policy compliance violation documentation from the policy effectiveness module 120. Policy compliance and reporting 115 may advise the system administrator on how to execute the designated network user compliance violation reporting procedures. The system prompts the system administrator through the non-compliance reporting process and presents a policy knowledge base. FIG. 40 is an exemplary screen display illustrating a policy knowledge query according to an embodiment of the Present Invention. A support icon may be available if the user needs to discuss a specific procedure with a Policy Consultant.

Block 604 represents the policy knowledge database of policy compliance and reporting 115. The policy knowledge database is comprised of automated network user policy compliance violation documentation. It may include network policy violation report forms, detailed reporting instructions and investigation procedures checklist. Policy compliance and reporting 115 analyzes the network user policy compliance violation information from the policy knowledge database 604 and determines if investigation actions are needed.

After the system analyzes the violation information, a policy violation investigation report form may be displayed on the user screen. FIG. 41 is an exemplary screen display illustrating a policy compliance violation report according to an embodiment of the Present Invention. All reports are documented in read-only format and all modifications and changes to the non-compliance reports are an addendum to the initial report. The system administrator may be asked to supply the network compliance violation information: the network user's name, e-mail address, title, department, mail station, type of violation, the date of the policy violation, the date of the report, and the official report of the incident to the network user, system administrator, and in higher level non-compliance cases, the policy officer will be notified.

Figure 42:
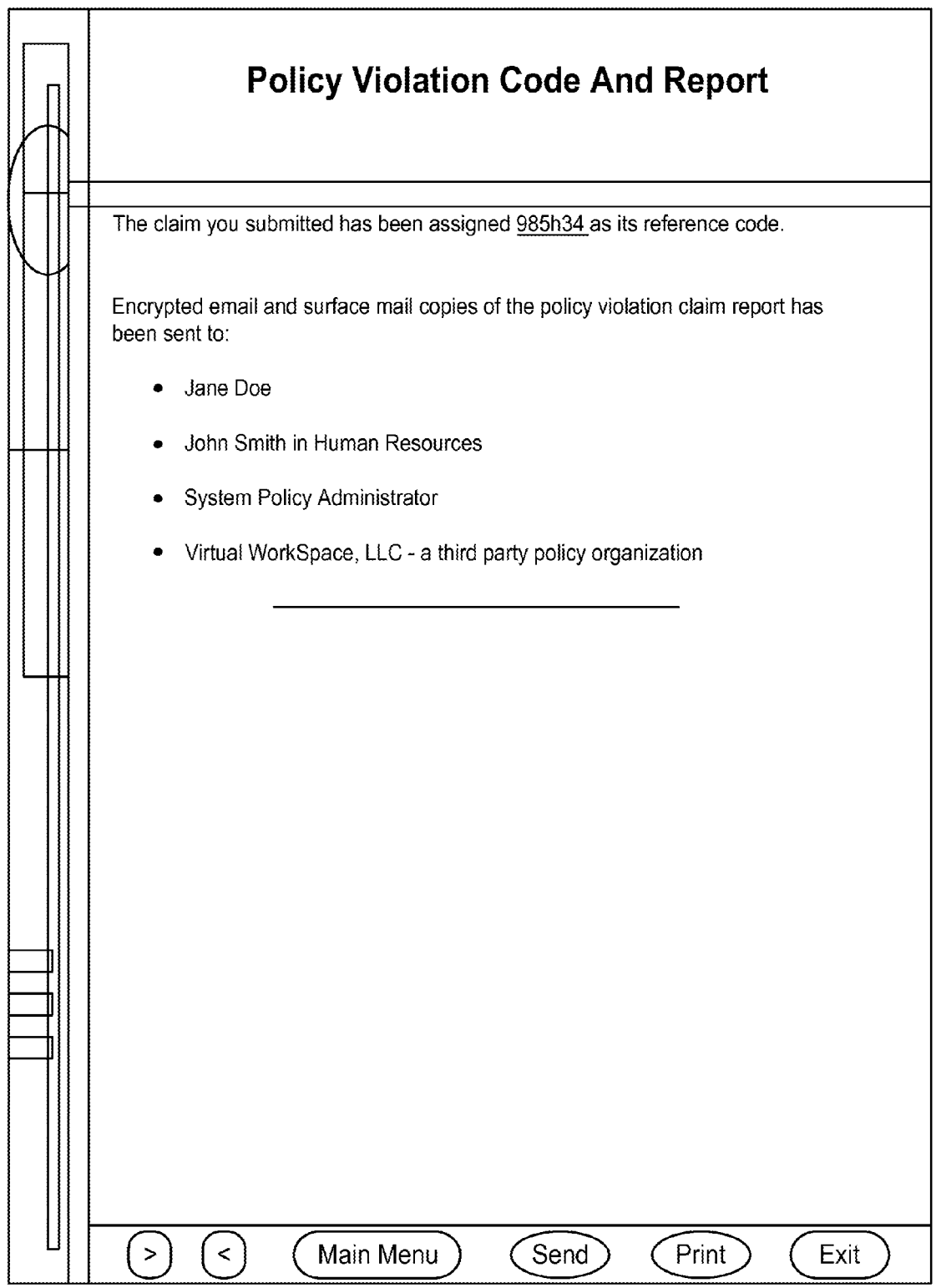
FIG. 42 is an exemplary screen display illustrating a policy compliance violation code and report according to an embodiment of the Present Invention.

A code is assigned to the policy compliance violation report. FIG. 42 is an exemplary screen display illustrating a policy compliance violation code and report according to an embodiment of the Present Invention. Block 606 represents the policy compliance and reporting 115 assigning a code to the policy compliance violation report. The code is used to identify and track the policy compliance violation report in the policy effectiveness database. The system administrator, the policy officer and the network user are the parties that may access to the policy compliance violation report. To access the policy compliance violation report the system administrator, the policy officer and the network user are given the access code to the report and are registered in the system. The system administrator can access a network user's policy compliance history report, the policy compliance violation report, and all communications related to the matter may automatically be sent via e-mail to a third party organization and may be kept in escrow. This insures that the organization cannot access the policy compliance reports in the system to change the contents of the reports and that the organization follows due the appropriate process and procedures.

The system administrator may contact the policy officer to schedule an in-person appointment with the network user. Block 608 represents the policy compliance and reporting 115 recording the appointment. Block 610 represents the policy compliance and reporting 115 scheduling the appointment. A hyperlink to a scheduling module is activated. An example of a schedule module is Microsoft's Schedule Plus. Several meeting options are listed on the violation report to be e-mailed and surface mailed to the network user. FIG. 43 is an exemplary screen display illustrating a System Violation Notice Email and Snail Mail Notice according to an embodiment of the Present Invention. The system monitors and records the reporting and investigation process in the policy effectiveness database.

All registered parties are automatically e-mailed the policy compliance violation report, all correspondence related to the report and the appointment date. Block 508 the report information is distributed. A copy of the policy compliance violation report is automatically sent to policy effectiveness, the system administrator, the policy officer, the network user and surface mail is printed and sent to the network user. The surface mail and e-mail reports are form letters that may include an Internet address to inform the network user about the policy compliance violation reporting process. Policy compliance and reporting 115 tracks and monitors the status of the complaint by monitoring the scheduling module and tracking where the report is in the system. Block 612 represents the policy compliance and reporting 115 distributing the policy compliance violation report information.

Printed copies of the policy compliance violation report, correspondence and related documents have a watermark printed in the header of the print out of the policy compliance violation report with the words "corporate record" printed on the top corner of the document. The printout may include the date the document was created, who created the document, the version number of the report and the file path. This is used to insure the authenticity of the policy compliance violation report.

Subsequent Action Report

Figure 7:
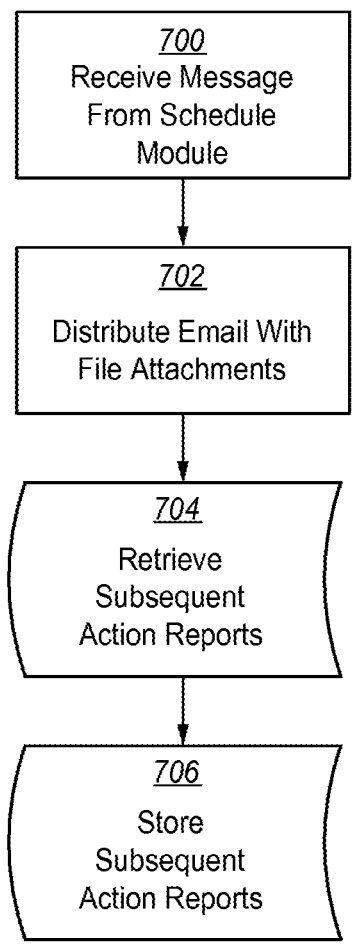
FIG. 7 is a block diagram further illustrating the steps performed by a policy compliance and repotting module according to an embodiment of the Present Invention.

FIG. 7 is a block diagram further illustrating the steps performed by the policy compliance and reporting module 115 according to an embodiment of the Present Invention in generating a subsequent action report. FIG. 44 is an exemplary screen display illustrating a Subsequent Action Report according to an embodiment of the Present Invention. Block 700 represents the policy compliance and reporting module 115 receiving a message from the schedule module to begin subsequent action procedures. The policy officer, the system administrator and the network user are automatically reminded via e-mail of the requirement to individually file subsequent meeting reports with the system. Block 702 represents the policy compliance and reporting module 115 distributing notices via email. The policy officer, the system administrator and the network user are required to present login and password/token information to file subsequent action reports with the system and to verify a policy compliance violation meeting occurred.

The network user is also asked to sign an agreement indicating he attended the policy enforcement meeting and reviewed the policies of the organization. The system administrator and policy officer are asked to confirm and document that the meeting took place. All parties are to complete the forms. Block 704 represents the policy compliance and reporting module 115 reviewing subsequent action reports from the parties. The system stores the documents in the policy effectiveness database.

The system administrator is prompted by the system to confirm the subsequent action report. The subsequent action report form indicates if the network user policy compliance violation is still under investigation, pending or is closed.

Block 706 represents the policy compliance and reporting module 115 indicating information related to the subsequent action reports. The policy compliance and reporting module 115 monitors the status of all network user compliance violations to insure that the violation reports are properly reported and managed.

The Appeal Process

Figure 8:
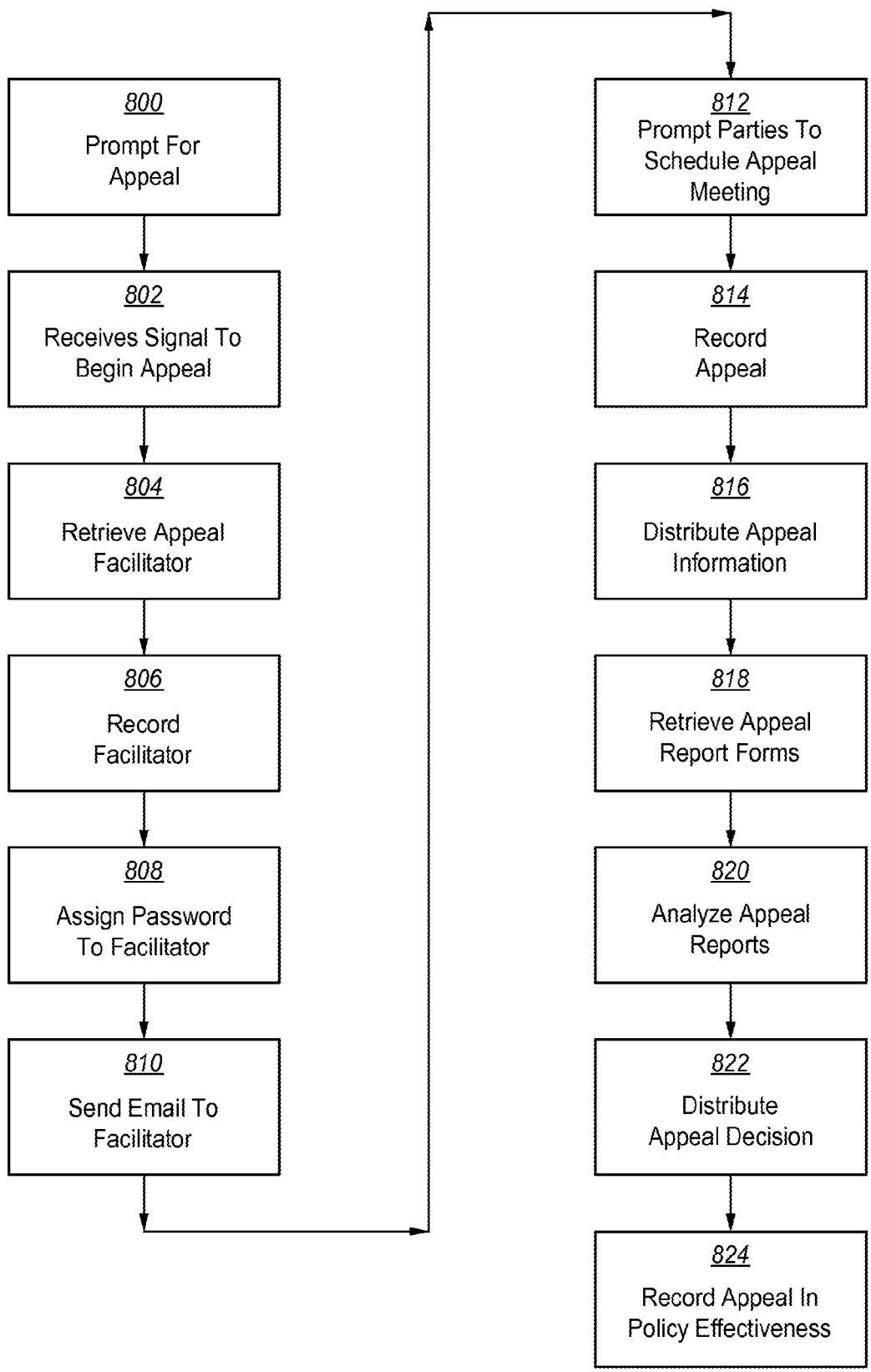
FIG. 8 is a block diagram illustrating the appeal process perforated by a policy compliance and reporting module according to an embodiment of the Present Invention.
Figure 45:
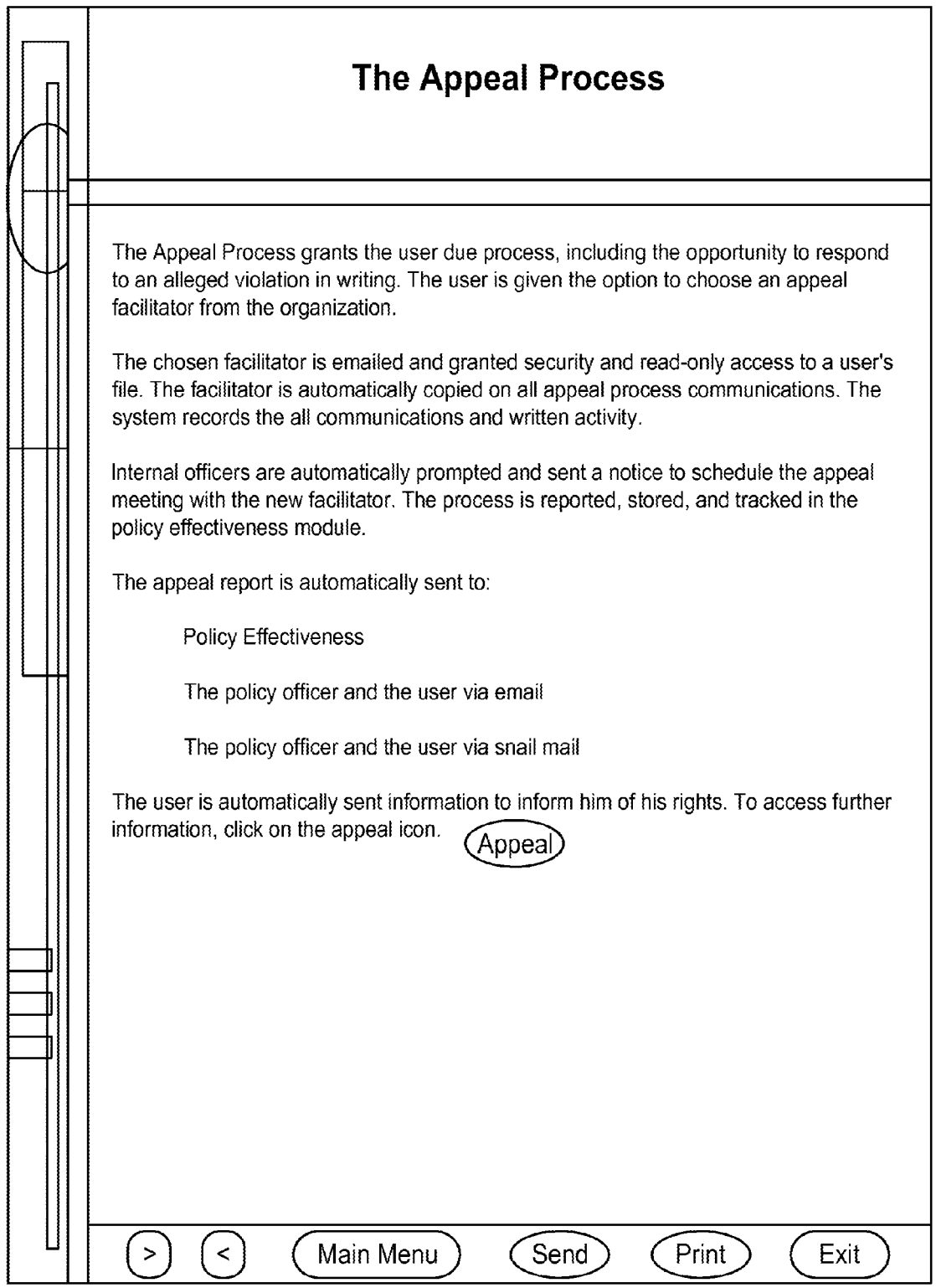
FIG. 45 is an exemplary screen display illustrating The Appeal Process according to an embodiment of the Present Invention.

FIG. 8 is a block diagram illustrating the appeal process performed by a policy compliance and reporting module according to an embodiment of the Present Invention. FIG. 45 is an exemplary screen display illustrating the Appeal Process according to an embodiment of the Present Invention. After filing the subsequent action report, the system gives the network user the opportunity to respond to an appeal regarding the network compliance violation. Block 800 represents the policy compliance and reporting module 115 prompting the network user with an appeal option. Block 802 represents the policy compliance and reporting module 115 receiving a signal to begin appeal process. The network user is given the option of choosing an appeal facilitator from the organization. Appeal facilitators are employees of the organization randomly chosen by the system to act as a facilitator for the appeal process. The policy compliance and reporting module 115 reviews network user profiles and chooses the network users with the lowest network user policy compliance violations to be facilitator candidates. Block 804 represents the policy compliance and reporting module 115 retrieving the appeal facilitator information from the policy compliance and reporting database. The user may choose the facilitator from the Appeal screen. The system records the process and automatically sends an email to the facilitator. Block 806 represents the policy compliance and reporting module 115 recording the facilitator. Block 808 represents the policy compliance and reporting module 115 assigning a password to the facilitator. Block 810 represents the policy compliance and reporting module 115 sending an email to the facilitator. The e-mail explains the appeals process to the facilitator and provides the facilitator with the passwords needed to access to the network user policy compliance violator's file. The facilitator has read-only access to the network user compliance violation reports. The facilitator is automatically copied on all appeal process communications. The system records this activity and stores it in the policy effectiveness database.

Next, the internal officers are automatically prompted and sent a notice to schedule the appeal meeting with a new facilitator, the network user, the system administrator and the policy officer. Block 812 represents the policy compliance and reporting module 115 prompting users to schedule an appeal meeting. The process is reported, stored and tracked in the policy effectiveness module. Block 814 represents the policy compliance and reporting module 115 recording the process. The appeal report is automatically sent to internal policy officers. The network user is automatically sent information to inform him of his procedural rights. The appeal report is automatically sent to the policy effectiveness module, the policy officer and the network user. Surface mail is sent to the policy officer and the network officer. Block 816 represents the policy compliance and reporting module 115 distributing appeal information to all parties.

The facilitator logs into the system and reviews all of the documents regarding the policy violation. The facilitator, the policy officer and the network user meet to listen to the violator's appeal. The facilitator and the policy officer are required to present login and password/token information to file appeal reports and to verify an appeal meeting occurred. Block 818 represents the policy compliance and reporting module 115 retrieving appeal report forms from the policy compliance and reporting database. The appeal reports are comprised of several fields. The facilitator and the policy officer are required to complete the online reports. The policy effectiveness analyzes the appeal reports to determine the final decision. Block 820 represents the policy compliance and reporting module 115 analyzing the appeal reports. An email is sent to all parties with the final decision file attached. Block 822 represents the policy compliance and reporting module 115 distributing the final appeal decision. Block 824 represents the policy compliance and reporting module 115 transferring the appeal information to the policy effectiveness module 120.

Policy Effectiveness Module

Policy effectiveness module 120 electronically collects, records, analyzes and stores information from policy compliance monitoring, analyzes policy compliance and reporting, evaluates network policy compliance actions undertaken in response to the network security policy violations and electronically implements a different network security policy selected from network security policies stored in a policy database.

Policy effectiveness module 120 analyzes information collected from policy compliance and reporting 115 to determine if network user compliance policies are effective. FIG. 46 is an exemplary screen display illustrating policy effectiveness reports according to an embodiment of the Present Invention. FIG. 47 is an exemplary screen display illustrating policy effectiveness reports according to an embodiment of the Present Invention, If a policy is determined to be ineffective, then a new policy may need to be implemented.

Policy effectiveness module 120 monitors the policy compliance actions taken over a period of time. At the time the system is implemented, the system administrator may set the system to measure network compliance actions that have been undertaken on a monthly, quarterly, annual or historic (e.g., year-to-date) basis. After the monitoring time period has been recorded in the system, the system administrator may record the number of network policy compliance actions per network compliance policy considered acceptable during a specific period of time.

Policy effectiveness module 120 analyzes the policy compliance actions stored in policy compliance and reporting module 115. Each policy is assigned a value representing a target baseline compliance level for network policy compliance ("baseline network policy compliance"). In one embodiment, the numeric value assigned to each monitored policy is 95, representing that for each policy 100% user compliance is required. The level of user compliance for a group of network users with respect to a particular policy is monitored. The network user compliance activity for a group has a numeric value that the system monitors representing the degree of group user policy compliance ("group user policy compliance"). The baseline network compliance value is monitored in relation to the user compliance value stored in the network security policy database 506.

Figure 9:
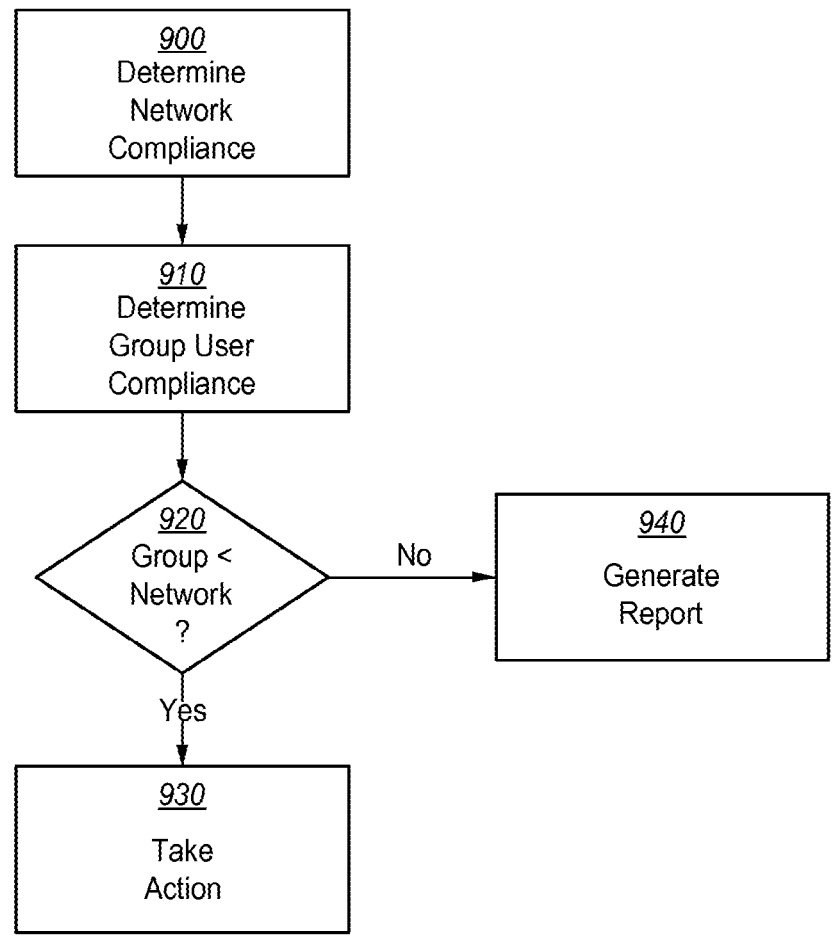
FIG. 9 is a block diagram further illustrating a policy effectiveness system according to an embodiment of the Present Invention.

FIG. 9 is a block diagram further illustrating a policy effectiveness system according to an embodiment of the Present Invention. Block 900 represents the policy effectiveness module 120 determining network policy compliance. Block 910 represents the policy effectiveness module 120 determining group user compliance. Block 920 is a decision block representing the policy effectiveness module 120 analyzing the baseline network policy compliance value in relation to the group user compliance policy value. If the group user policy compliance value is greater than or equal to the baseline network policy compliance value, then Block 940 represents the policy effectiveness module 120 recording that the network is in compliance with respect to a policy. Otherwise, if the network policy compliance value is less than the group user policy compliance value, then policy effectiveness module 120 measures the difference between the baseline network policy compliance value and the group user policy compliance value and may undertake a network compliance action in response to that difference.

Each compliance action in the group is assigned a value related to a numeric value that may be reported from monitoring network user compliance. The numeric value assigned is based on the severity of the network policy compliance violation; i.e., the difference between the baseline network policy compliance value and the group user policy compliance value. Upon recording the difference between the baseline network policy compliance value and the group user policy compliance value, policy effectiveness module 120 records this information in network security policy database 130 and begins undertaking the appropriate network compliance action. This action may include electronically implementing a different network security policy selected from network security policies stored in the database, generating policy effectiveness reports and providing a retraining module to network users.

For example, the system administrator may have indicated that the password policy can not have more than five network compliance action occur per month. If the network compliance action is greater than five actions per month, then the system sends a message to retrieve a different policy from database 130. The policy selected is based on indexing criteria and on the difference between the group user policy compliance and the baseline network policy compliance values. Each policy has several actions ranging from lenient to restrictive. Policy effectiveness module 120 reviews the information collected by policy effectiveness to determine which policy to modify and the action to take. Policy effectiveness module 120 records the policy change and sends an email message to the system administrator to confirm the policy changing process. FIG. 48 is an exemplary screen display illustrating a policy effectiveness action according to an embodiment of the Present Invention. An enterprise wide email may be sent to all network users to alert them to the change in policy.

Policy Resources

Figure 49:
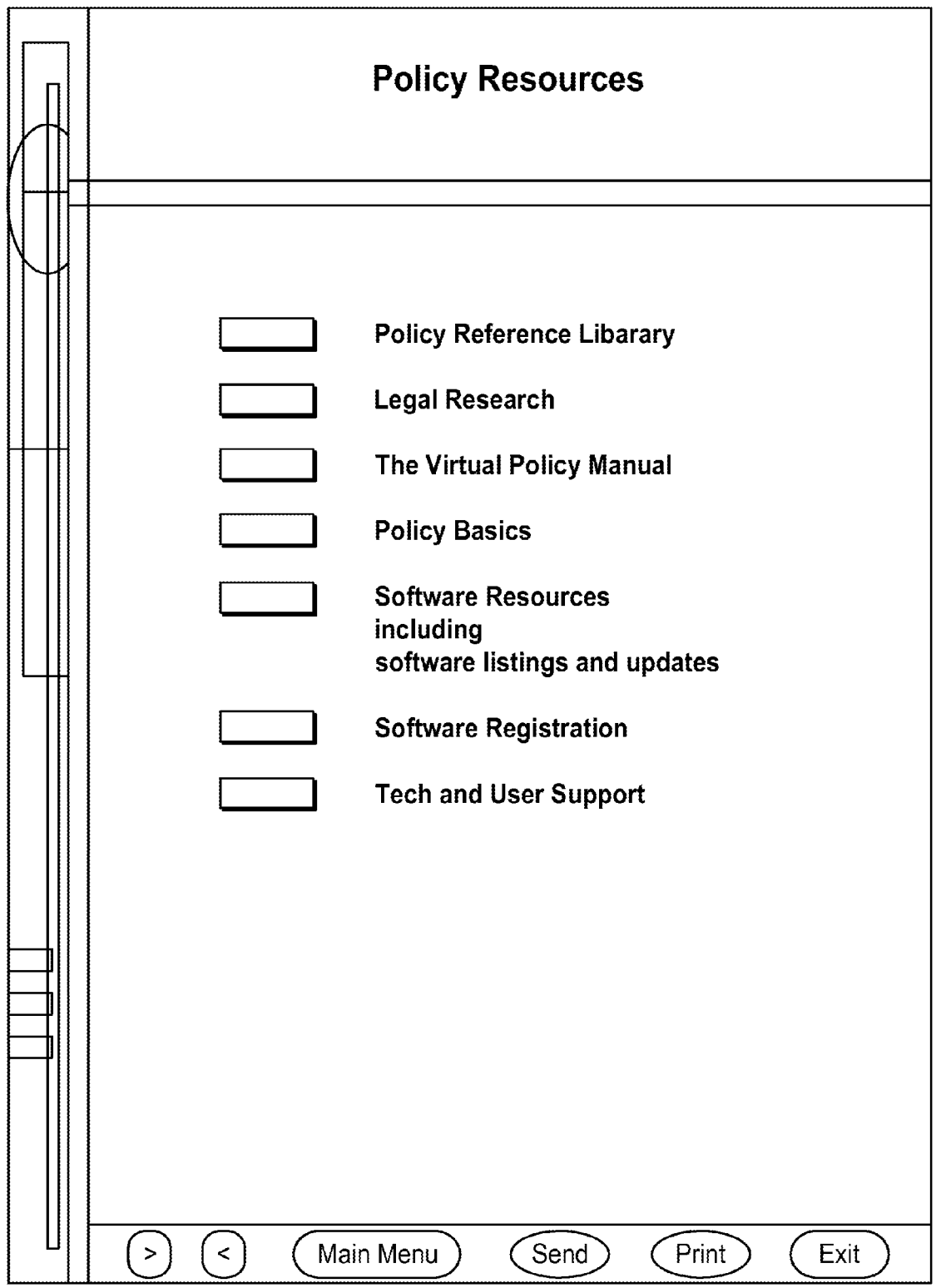
FIG. 49 is an exemplary screen display illustrating policy resources according to an embodiment of the Present Invention.

Policy effectiveness system 100 includes policy resources database 145 and software resources database to help users and administrators maintain policy compliance. FIG. 49 is an exemplary screen display illustrating policy resources according to an embodiment of the Present Invention. Materials included in the policy resources database 145 may include a policy reference library, legal research, a policy manual and a self-serve policy section. The policy reference library has a search engine to help the user quickly search and find policy information. Users can contact support personnel either by email, page, telephony, fax or telephone. It is important that users have immediate access to a support person, since major policy violations may require organizations to act quickly to protect their network from damage. Internal legal and policy personnel may also access legal statutes and other related policy documentation relating to email and virtual policies in the workplace. The policy manual is presented to users so that they will be able to read and review the policy manual periodically. Users are periodically required to sign an online form indicating that he has read the policies, all policy revisions, and understands all of the policies. Annual updated information will be highlighted for fast review. Policy effectiveness system 100 tracks a user's visit to the policy site. The self-serve policy section allows the policy officer to revise the policy. The policy officer is prompted to access the policy database and is instructed to download a new policy when the system determines that a policy is ineffective because users are consistently out of compliance with the current policy. The new policy(s) are automatically added to the policy effectiveness system and the organization's policy manual. Software resources include a listing of approved software and updates, and guidelines for proper use.

Security, System Backup and Recovery Processes

Users must present a password and hardware token to access policy effectiveness system 100. Most organizations concentrate their security resources on securing the perimeter of their network. Unfortunately, the greatest threat to an organization is its employees, who, with network access can cause greater damage than an external intruder.

Policy effectiveness system 100 employs an electronic tag to monitor document level access, security and to track information on a per document basis. This creates the opportunity to prove document authenticity, to track the copies and revisions of a document and to monitor and report document access and disclosures.

System Backup and Recovery

Policy effectiveness system 100 has an online backup feature. This feature offers full redundancy without the expense of off-site storage, and limits the process of physically cataloging and indexing of backup tapes. Cataloging and indexing backup tapes are automatically completed by the system.

Software Compliance

Most large organizations are not cognizant of the type of software licenses they have, which workstation and/or server has which software, who is using what software and whether or not the organization is in compliance with their software licensing agreements. Users can easily download software from the Internet. All software is distributed with compliance conditions or restrictions of its use.

To effectively monitor an organization's software compliance, periodic network audits are needed to identify deviations in the software inventory and to reconcile software license agreements with software and hardware inventories. FlexIM software by Globetrotter monitors software licenses.

Each user is registered in user profile database 150. User profile database 150 includes a user's hardware and software inventory information, as well as the user's name, email address, surface mail address, employment status (e.g., temp, contract, virtual), title, department, organizational chart indicating who the user reports to, the direct reports, his assistant and mail station address. It also may indicate the software present on a user's workstation and the user's system access and security status.

User profile database 150 also retain copies of any Employment Agreements and other employment-related contracts, maintains a record of the user's policy training and exam status, policy compliance history, network activity and any special network access or privileges such as using the network for charitable use. Additionally, user profile database 150 may also monitor software downloads from the network, or Internet, to hardware through network activity reports and network audits, including any software approved for use by management and other special approvals. Additional user information can be monitored and collected to assist the organization's reporting needs. Policy effectiveness system 100 includes an object library/object level licensing system similar to FlexIM by Globretrotter.

Policy compliance monitor 110 features dynamic updating and exchanging of software licensing agreements. The compliance monitor 110 reviews all software license agreements and maintains records of the vendor information. Policy compliance monitor 110 sends a notification to the system administrator indicating that a software license is about to expire. The system administrator is prompted to send an email to the licensing organization to update the license agreement. Once the updated license agreement is received via email, then the system automatically updates the software license registered and stores it in the compliance monitor 110. Policy effectiveness module 120 monitors and tracks network activity including all hardware and software in policy effectiveness system 100. This module can generate reports to track an organization's user access including failed login attempts, all attempts to launch privileged applications, any changes to system configuration parameters, software downloads from the Internet, software and hardware usage, location of software, location of software license agreements, type of software agreements, coordination of software license agreements with software utilization, statistical and graphical information regarding justification for software purchases, upgrades and maintenance expense, software installations, software compliance, appropriateness, inappropriateness and excessive use of software and hardware resources throughout the enterprise, the number of people waiting for access to software applications, access time, value of software being used at anytime, the need for upgrades, the need for training, projections for hardware, software and licensing costs/usage throughout the enterprise, hardware demand predictions, recommended re-route of software and hardware, personally installed or permitted software installation, need to streamline and more effectively use under utilized system resources, over utilization of system resources, potential policy infringements, system trends per department use and the allocation of related costs related to department.

Software Applications Archive

The system records the storage location of all the software applications, software manuals, and software vendor information used by the organization to create documents. In the event that records or documents, written in older versions of software, must be produced, the software will be preserved and available for use.

The foregoing description of the exemplary embodiments of the Present Invention has been presented for the purposes of illustration and description. It is not intended to be exhaustive or to limit the invention to the precise form disclosed. Many modifications and variations are possible in light of the above teaching. It is intended that the scope of the Present Invention be limited not with this detailed description, but rather by the Claims appended hereto.

What is claimed is:

1. A method for creating a network policy in a computer network, the method comprising:
   receiving user input from a first participant, the user input selecting one of a plurality of available screen personalities;
   presenting the first participant with a particular policy recommendation session configured to accommodate a plurality of participants and to represent each of the plurality of participants using a screen personality, wherein the first participant's screen personality corresponds to the available screen personality selected by the input from the first participant;
   selecting, using a hardware processor, a suggested policy;
   presenting, using the hardware processor, the suggested policy to the plurality of participants;
   obtaining, from one or more of the plurality of participants, network policy recommendations regarding the suggested policy; and
   generating the network policy based on the obtained network policy recommendations.

2. The method of claim 1, further comprising:
   evaluating the network policy by:
      generating a network policy compliance value based on monitoring network user compliance for a plurality of network users; and
      comparing the compliance value to a target compliance value, wherein the target compliance value defines a baseline for network policy compliance.

3. The method of claim 1, wherein the recommendations comprise modified network policies, the method further comprising:
   providing at least one modified network policy to the participants; and
   receiving a group-modified policy from the network users.

4. The method of claim 1, wherein the network policy comprises:
   a network hardware policy;
   an email policy;
   an internet policy;
   a software license policy;
   a document management system policy; or
   a network security enforcement policy.

5. The method of claim 1 further comprising modifying the generated network policy based on a network user compliance report.

6. The method of claim 1 further comprising providing a means for updating the generated network policy.

7. The method of claim 6 wherein the means for updating comprise:
   periodically reviewing a set of parameters of the network policy;
   determining the viability of each of the parameters of the set of parameters of the network policy; and
   adjusting one or more of the parameters of the set of parameters of the network policy based on the determination of viability.

8. The method of claim 1 further comprising:
   generating one or more additional network policies;
   for each of the network policy and the additional network policies, calculating a compliance value indicating network user compliance by a group of users;
   automatically analyzing the compliance values to identify an insufficient network policy based on network user compliance with the insufficient network policy; and
   automatically substituting a different network policy in place of the insufficient network policy.

9. The method of claim 1 wherein the network policy comprises an associated security level identifying the relative restrictiveness of the associated network policy.

10. A computer-readable memory device storing instructions that, when executed by a computing device, cause the computing device to perform operations for interactively generating a network policy, the operations comprising:
    providing a suggested network policy to a plurality of network users;
    receiving one or more modified first network policies from at least one of the network users;
    providing at least one of the modified first network policies to the network users;
    receiving a group of modified second network policies from the network users; and
    generating the final network policy based on the modified second network policies from the network users.

11. The computer-readable memory device of claim 10, further comprising:
    evaluating the final network policy by:
       generating a network policy compliance value based on monitoring network user compliance for a second plurality of network users; and
       comparing the compliance value to a target compliance value, wherein the target compliance value defines a baseline for network policy compliance.

12. The computer-readable memory device of claim 10 further comprising modifying the generated final network policy based on a network user compliance report.

13. The computer-readable memory device of claim 10 further comprising:
    generating one or more additional network policies;
    for each of the final network policy and the additional network policies, calculating a compliance value indicating network user compliance by a group of users;
    automatically analyzing the compliance values to identify an insufficient network policy based on network user compliance with the insufficient network policy; and
    automatically substituting a different network policy in place of the insufficient network policy.

14. The computer-readable memory device of claim 10 wherein the final network policy comprises an associated security level identifying the relative restrictiveness of the associated network policy.

15. A system for creating a network policy comprising:
    a transceiver configured to receive, from each of a plurality of participants, a user input selecting one of a plurality of available screen personalities;
    a policy recommendation session initiator configured to present the plurality of participants with a policy recommendation session, the policy recommendation session configured to represent each of the plurality of participants using a screen personality corresponding to that participant's available screen personality selection; and a policy suggester configured to present a policy to the plurality of participants;

an opinion collector configured to obtain, from the plurality of participants, network policy recommendations regarding the suggested policy; and a network policy generator configured to generate the network policy based on the obtained recommendations.

16. The system of claim 15, further comprising:
evaluating the network policy by:
generating a network policy compliance value based on monitoring network user compliance for a plurality of network users; and
comparing the compliance value to a target compliance value, wherein the target compliance value defines a baseline for network policy compliance.

17. The system of claim 15 wherein the policy recommendation session further presents the plurality with a facilitator to moderate the policy recommendation session's content or time.

18. The system of claim 15 further comprising modifying the generated network policy based on a network user compliance report.

19. The system of claim 15 further comprising:
generating one or more additional network policies;
for each of the network policy and the additional network policies, calculating a compliance value indicating network user compliance by a group of users;
automatically analyzing the compliance values to identify an insufficient network policy based on network user compliance with the insufficient network policy; and
automatically substituting a different network policy in place of the insufficient network policy.

20. A system for interactively generating a network policy comprising:
means for providing a suggested first network policy to a plurality of network users;
means for receiving one or more modified second network policies from at least one of the network users;
means for providing at least one of the second modified network policies to the network users;
means for receiving a group of third modified network policies from the network users; and
means for generating the final network policy based on the modified third network policies from the network users.

* * * * *